(12) United States Patent
Carr et al.

(10) Patent No.: US 8,995,159 B1
(45) Date of Patent: Mar. 31, 2015

(54) HIGH-FREQUENCY MATRIX CONVERTER WITH SQUARE WAVE INPUT

(75) Inventors: Joseph Alexander Carr, Cary, NC (US); Juan Carlos Balda, Fayetteville, AR (US)

(73) Assignee: U.S. Department of Energy, Washington, DC (US)

( * ) Notice: Subject to any disclaimer, the term of this patent is extended or adjusted under 35 U.S.C. 154(b) by 226 days.

(21) Appl. No.: 13/592,381

(22) Filed: Aug. 23, 2012

Related U.S. Application Data

(60) Provisional application No. 61/530,083, filed on Sep. 1, 2011.

(51) Int. Cl.
*H02M 5/06* (2006.01)
*H02J 3/18* (2006.01)

(52) U.S. Cl.
CPC .................................. *H02J 3/18* (2013.01)
USPC ................................... 363/159; 363/10

(58) Field of Classification Search
USPC ............... 363/1–10, 17, 34–37, 131, 132, 363/148–165
See application file for complete search history.

(56) References Cited

U.S. PATENT DOCUMENTS

| | | | |
|---|---|---|---|
| 4,812,729 A * | 3/1989 | Ito et al. ..................... | 318/732 |
| 5,710,699 A | 1/1998 | King et al. | |
| 6,069,800 A * | 5/2000 | Cross et al. ................. | 363/20 |
| 7,227,277 B2 | 6/2007 | Chapman et al. | |
| 8,089,780 B2 * | 1/2012 | Mochikawa et al. ......... | 363/17 |
| 2003/0095424 A1 * | 5/2003 | Oates ......................... | 363/132 |
| 2010/0091534 A1 * | 4/2010 | Tadano ....................... | 363/157 |
| 2012/0113683 A1 * | 5/2012 | Perisic et al. ............... | 363/17 |

* cited by examiner

*Primary Examiner* — Nguyen Tran
(74) *Attorney, Agent, or Firm* — Michael J. Dobbs; Daniel D. Park; John T. Lucas

(57) ABSTRACT

A device for producing an alternating current output voltage from a high-frequency, square-wave input voltage comprising, high-frequency, square-wave input a matrix converter and a control system. The matrix converter comprises a plurality of electrical switches. The high-frequency input and the matrix converter are electrically connected to each other. The control system is connected to each switch of the matrix converter. The control system is electrically connected to the input of the matrix converter. The control system is configured to operate each electrical switch of the matrix converter converting a high-frequency, square-wave input voltage across the first input port of the matrix converter and the second input port of the matrix converter to an alternating current output voltage at the output of the matrix converter.

20 Claims, 15 Drawing Sheets

HIGH-FREQUENCY MATRIX CONVERTER WITH SQUARE WAVE INPUT

CROSS-REFERENCE TO RELATED APPLICATIONS

This application claims priority to U.S. Provisional Patent Application 61/530,083, filed Sep. 1, 2011, and is hereby fully incorporated by reference.

GOVERNMENT INTERESTS

The United States Government has rights in this invention pursuant to Contract No. DE-FC26-07NT43220, between the U.S. Department of Energy (DOE) and the University of Arkansas.

FIELD OF THE INVENTION

The present invention relates to a matrix converter with a square wave input for producing an alternating current voltage output, preferably for providing energy from a high-frequency input to a grid.

BACKGROUND OF THE INVENTION

As renewable resources are developed there is a greater need for low-cost, efficient, and compact means of converting energy from a variety of sources for transfer to the grid. One barrier to a full adoption of these renewable energy sources is transferring energy from the energy source, generally just a few volts DC into the grid, generally at least 110 Volts AC. Multiphase systems further complicate matters. Due to the complexity of converting the supplied DC voltage for supplying energy to the grid, for example in synchronizing with the energy grid, and size of the electrical components, for example large transformers, it is highly desirable to be able to reuse these components across a variety of energy sources, for example photovoltaics, wind farms, fuel cells, etc. Reusing components has the potentially to reduce cost, size, heat, and increase efficiency.

There has been a recent push towards efforts in multiple input converter systems. For example, U.S. Pat. No. 7,227,277 describes a DC to DC system combining many components of the buck boost converter in an effort to reduce cost. However, the system described in U.S. Pat. No. 7,227,277 must additionally convert the energy from DC to AC and properly synchronize with the grid in order to provide energy to the grid. Generally, a larger transformer will be required to amplify the voltage from the converter to the voltage of the grid. Therefore, there is a need in the art for a low cost energy, efficient, compact, energy conversion means, preferably easily allowing for multiple inputs.

SUMMARY OF THE INVENTION

A device for producing an alternating current output voltage from a high-frequency, square-wave input voltage comprising, high-frequency, square-wave input a matrix converter and a control system. The High-Frequency, Square-Wave Input comprises a first port and a second port. The matrix converter comprises a first port, a second port, a plurality of electrical switches, and an output. The first port of the high-frequency input and the first port of the matrix converter are electrically connected to each other. The second port of the high-frequency input, and the second port of the matrix converter electrically are connected to each other. The control system is connected to each switch of the matrix converter. The control system is electrically connected to the first input of the matrix converter and the second input of the matrix converter. The control comprises a means for detecting the voltage across the first input of the matrix converter and the second input of the matrix converter. The control system is configured to operate each electrical switch of the matrix converter converting a high-frequency, square-wave input voltage across the first input port of the matrix converter and the second input port of the matrix converter to an alternating current output voltage at the output of the matrix converter. The alternating current output voltage at the output of the matrix converter has a frequency less than the high-frequency, square-wave input voltage across the first input port of the matrix converter and the second input port of the matrix.

DETAILED DESCRIPTION OF THE INVENTION

A device for producing an alternating current output voltage from a high-frequency, square-wave input voltage comprising, high-frequency, square-wave input a matrix converter and a control system. The High-Frequency, Square-Wave Input comprises a first port and a second port. The matrix converter comprises a first port, a second port, a plurality of electrical switches, and an output. The first port of the high-frequency input and the first port of the matrix converter are electrically connected to each other. The second port of the high-frequency input, and the second port of the matrix converter electrically are connected to each other. The control system is connected to each switch of the matrix converter. The control system is electrically connected to the first input of the matrix converter and the second input of the matrix converter. The control comprises a means for detecting the voltage across the first input of the matrix converter and the second input of the matrix converter. The control system is configured to operate each electrical switch of the matrix converter converting a high-frequency, square-wave input voltage across the first input port of the matrix converter and the second input port of the matrix converter to an alternating current output voltage at the output of the matrix converter. The alternating current output voltage at the output of the matrix converter has a frequency less than the high-frequency, square-wave input voltage across the first input port of the matrix converter and the second input port of the matrix.

Preferably, the device further comprises a matrix voltage clamp comprising a first port, and a second port. The matrix voltage clamp limits the voltage across the first port and the second port to a predetermined maximum voltage.

Preferably, the control system is configured to convert the voltage across the first input of the matrix converter and the second input of the matrix converter to an alpha and beta domain. Using the alpha and beta domain, the control system preferably determines which sector the reference vector lies within a predetermined SVPVVM Hexagon, preferably FIG. 14 as described below. Then the control system preferably determines the control signals, preferably using a predetermined table, more preferably using a table 3 as described below, for each switch of the matrix converter using the determined sector and the alpha and beta domain.

FIG. 1

Figure 1:
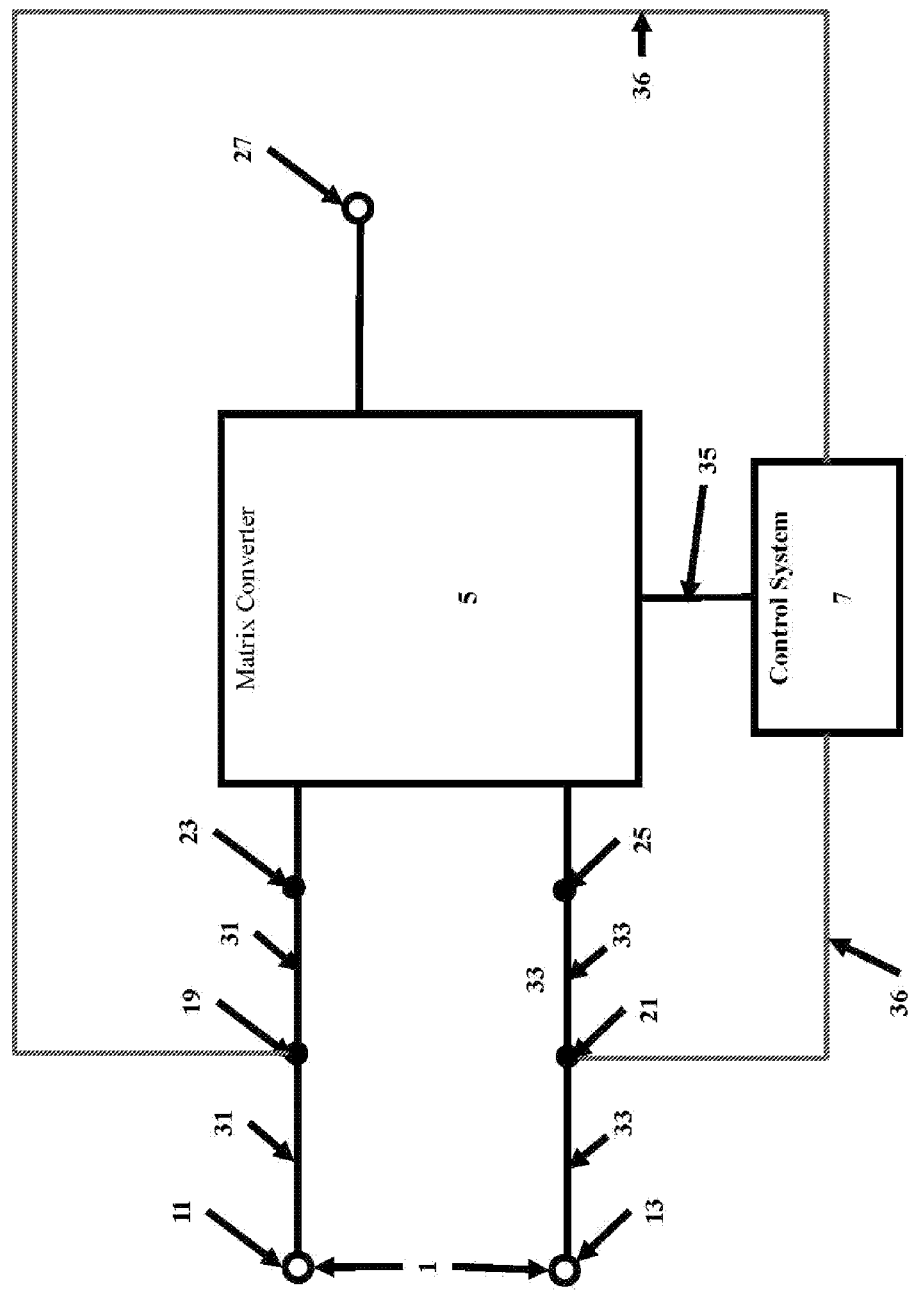
FIG. 1 depicts one embodiment of a high-frequency matrix converter with a square wave input.

FIG. 1 depicts one embodiment of a high-frequency matrix converter with a square wave input comprising a High-Frequency, Square-Wave Input 1 a matrix converter 5, and a control system 7. The High-Frequency, Square-Wave Input 1 comprises a first port 11, a second port 13. The matrix converter 5 comprises a first input port 23, a second input port 25, and a first output port 27.

As shown in FIG. 1, the first port 11 of the High-Frequency, Square-Wave Input 1, and the first input port 23 of the matrix converter 5 are electrically connected via one or more first wires 31. As shown in FIG. 1, the second port 13 of the High-Frequency, Square-Wave Input 1, and the second input port 25 of the matrix converter 5 are electrically connected via one or more second wires 33. The control system 7 is electrically connected to the matrix converter 5 via one or more control wires 35.

The control system 7 is electrically connected to the first input port 23 of the matrix converter 5 and the second input port 25 of the matrix converter 5 using one or more voltage reference wires 36. This connection allows the control system 7 to detect the input voltage. Preferably, the first input port 23 of the matrix converter 5 or the second input port 25 of the matrix converter 5 are a common neutral voltage shared by the matrix converter 5, control system 7, and the device connected to the High-Frequency, Square-Wave Input 1.

The High-Frequency, Square-Wave Input 1

The High-Frequency, Square-Wave Input 1 comprises a first port 11 and a second input port 13. Preferably, the first port 11 and the second input port 13 are adapted for connection to a high-frequency bus or for connection directly to a high-frequency, square wave energy source. The high-frequency is a frequency higher than the output frequency, preferably above 1 KHz, more preferably above 10 KHz. The square wave is any AC voltage source having substantial time periods at a constant voltage, more preferably at least substantially representing a square wave. In one embodiment, the first port 11 and a second input port 13 are connected to the energy output of a high-speed turbine producing a high-frequency energy output. In an alternate embodiment, the first port 11 and a second input port 13 are connected one or more electronics configured to convert energy from energy source, for example photovoltaic, geothermal, energy sources, to a high-frequency, square wave.

Matrix Voltage Clamp 3

The matrix voltage clamp 3 limits the voltage to a predetermined maximum voltage between the first input port 23 of the matrix converter 5 and the second input port 25 of the matrix converter 5 creating at least an approximation of a square wave. The at least an approximation of a square wave is advantageous as it simplifies the operation of the matrix converter 5. Preferably, the matrix voltage clamp 3 is a passive clamp, more preferably as described in FIG. 3b or FIG. 4b. In embodiments without the use of a transformer between the matrix converter and to the High-Frequency, Square-Wave Input 1, the matrix voltage clamp 3 is an active clamp, more preferably as described in FIG. 3c or FIG. 4c.

Matrix Converter 5

The matrix converter 5 comprises a plurality of electrical switches operated to produce an alternating current. The matrix converter 5 samples the input voltage and synthesizes an AC (alternating current) voltage on its output, preferably a voltage relating to a sinusoidal voltage. Preferably, a modified space-vector pulse-width modulation (SVPWM) technique as described below is used. Preferably, a set of vectors is first defined which describe the output voltage of the matrix converter 5 for a given combination of switch states. The output voltage for each state is selected by the electrical switches of the matrix converter 5. The switches need to be switched in a manner to prevent shorting the voltage source of on the input side in order to prevent damage. An open circuit in series with an inductor is preferably avoided, as an open circuit in series with an inductor will cause voltage spikes.

Control System 7

The control system 7 is a device that controls at least the matrix converter 5, for the production of an alternating current by the matrix converter 5. In a preferred embodiment, the control system 7 comprises a microcontroller (e.g. ATEMGA128 as sold by ATMEL), programmed to switch on/off the one or more switches of the matrix converter 5 in order to produce the desired output.

The control comprises a voltage detector electrically connected to the first input of the matrix converter and the second input of the matrix converter. The voltage detector is any method or apparatus for detecting a voltage. Preferably, the voltage detector comprises an analog-to-digital converter, more preferably integrated within a microcontroller, for example the ATMEGA128 as sold by ATMEL. In the alternative, the voltage detector is an external analog-to-digital device, thereby converting the detected voltage to a digital to be read and used by the control system. In an alternate embodiment, the voltage detector is one or more zener diodes, voltage comparators, transistors, or a combination thereof are used to detect the voltage. For example, in one embodiment, the voltage detector comprises one or more zener diodes or voltage comparators used to detect when the voltage exceeds a predetermine maximum. Additionally, one or more transformers, voltage dividers or other voltage attenuation means are preferably also used to limit the voltage at the input of the voltage detector in order to avoid damaging electrical components.

FIG. 2

Figure 2:
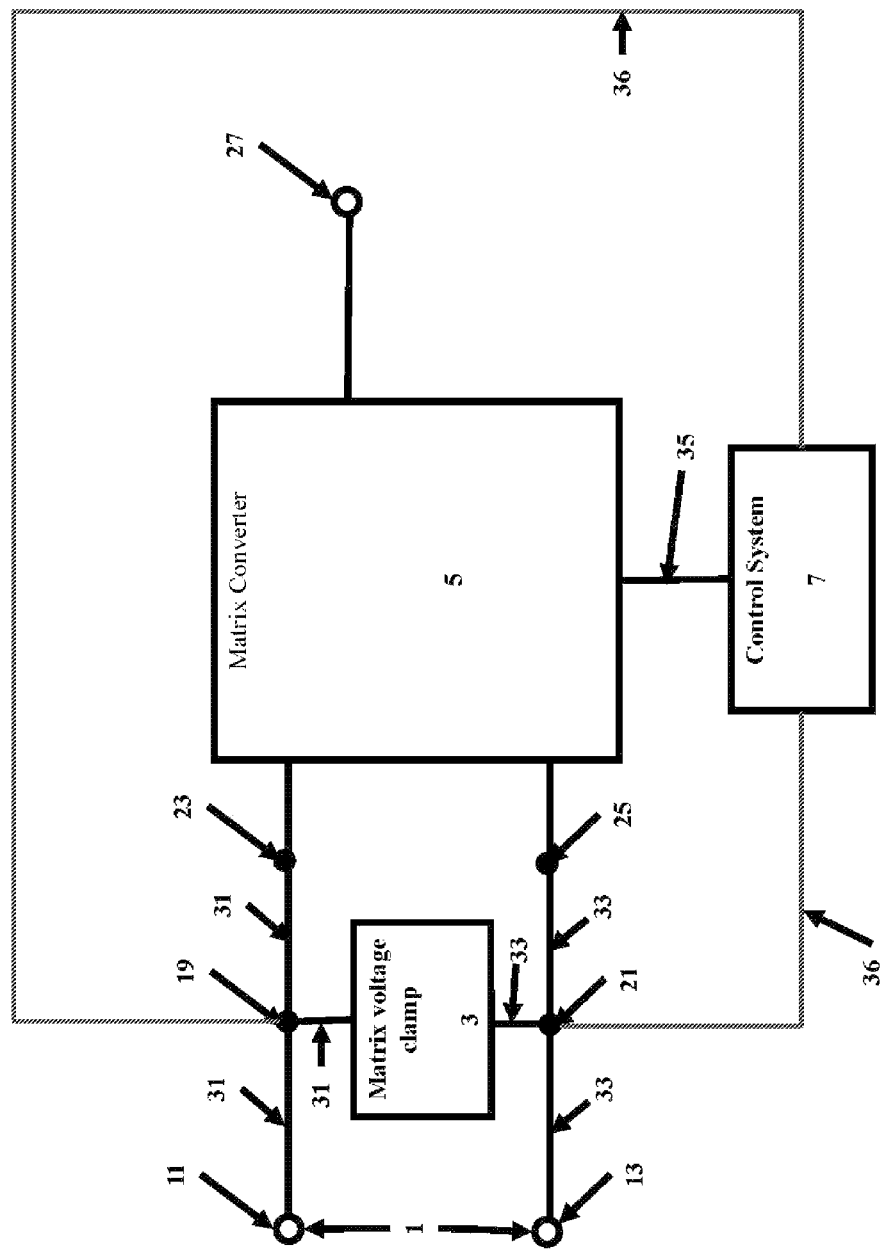
FIG. 2 depicts one embodiment of a high-frequency matrix converter with a square wave input comprising a matrix voltage clamp.

FIG. 2 depicts one embodiment of a high-frequency matrix converter with a square wave input comprising a High-Frequency, Square-Wave Input 1 further comprising a matrix voltage clamp 3. This embodiment is the same as the embodiment shown in FIG. 1 and described above with the addition of the matrix voltage clamp 3. The matrix voltage clamp 3 reduces voltage spikes and clamps voltages for simple operation. The matrix voltage clamp 3 has a first port 19 and a second port 21. In this embodiment, the first port 19 of the matrix voltage clamp 3, the first port 11 of the high-frequency input 1, and the first port 23 of the matrix converter 5 are electrically connected to each other via one or more first wires 31. The second port 21 of the matrix voltage clamp 3, the second port 13 of the high-frequency input 1, and the second port 25 of the matrix converter 5 are electrically connected to each other via one or more second wires 33.

The matrix voltage clamp 3 limits the electrical voltage between its first port 19 and its second port 21. The matrix voltage clamp 3 is advantageous to the system as it reduces or more preferably, eliminates high voltage transients, for example created during switching. The removal of the transients, and more preferably, the creation of a square wave, allows for simpler control system. Therefore, preferably, the matrix voltage clamp 3 is set to limit the voltage between its first port 19 and its second port 21 to a predetermined maximum voltage. Preferably, the predetermined maximum voltage is selected for at least an approximation of a square wave, while also limiting the amount of voltage attenuation.

In one embodiment, the matrix voltage clamp 3 is an active matrix voltage clamp connected to the control system 7, thereby allowing for further optimization and energy storage. In an alternative embodiment, the matrix voltage clamp 3 is a passive device limiting the maximum voltage automatically, for example a diode, more preferably with a capacitor connected in series, connected between the first port 19 and the second port 21 of the matrix voltage clamp 3.

Preferably, the matrix voltage clamp 3 serves as the clamp for all energy sources connected to the High-Frequency, Square-Wave Input 1, thereby reducing the number of components in the system.

FIG. 3a

Figure 3:
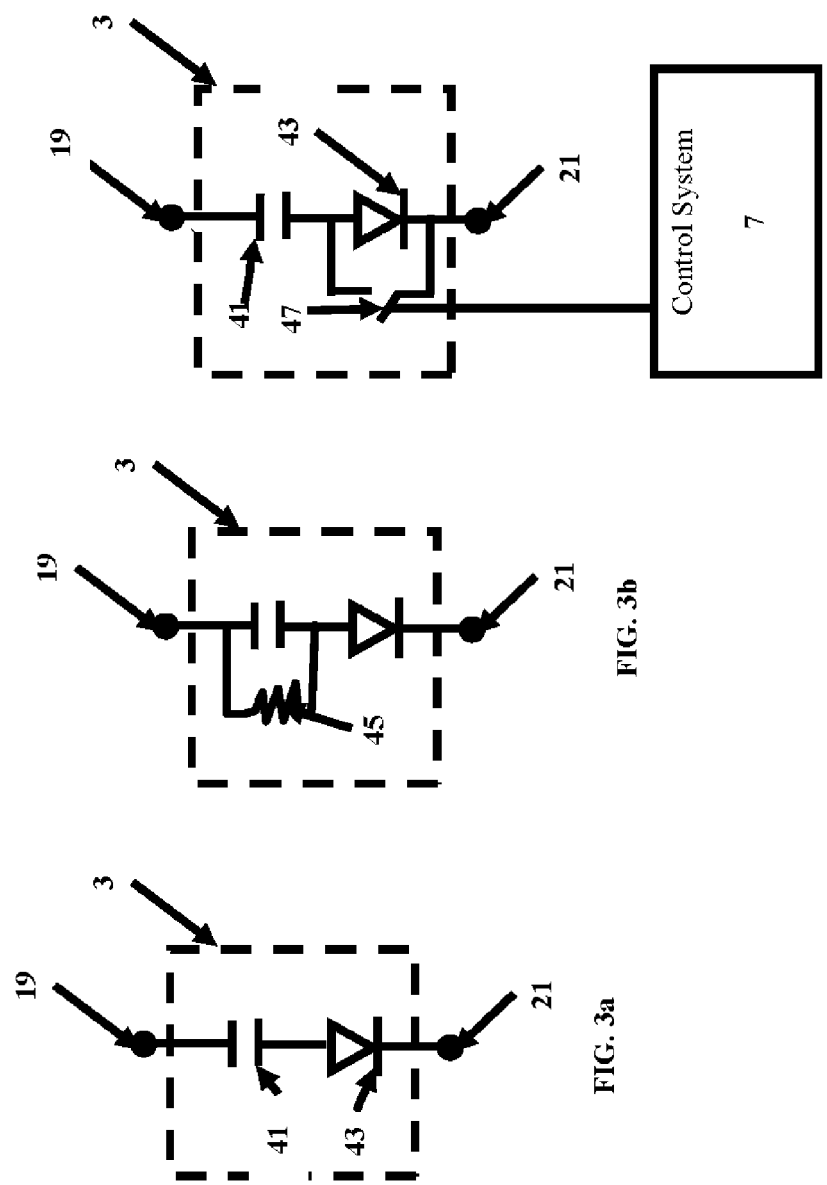
FIG. 3a depicts one embodiment of a matrix voltage clamp.
FIG. 3b depicts one embodiment of a matrix voltage clamp comprising a discharging resistor.
FIG. 3c depicts one embodiment of a matrix voltage clamp comprising a switch for charge recuperation.

FIG. 3a depicts one embodiment of a voltage clamp. As shown in FIG. 3a, the matrix voltage clamp 3 comprises a first capacitor 41 and a first diode 43 electrically connected in series. The first capacitor 41 is electrically connected to the first port 19 of the matrix voltage clamp 3, and the first diode 43. The first diode 43 is electrically connected to the first capacitor 41 and the second port 21 of the matrix voltage clamp 3.

When the voltage across the first port 19 and the second port 33 exceeds first capacitor 41 voltage, the first diode is 43 biased on. Current flows from the second port 21 through the first diode 43, through the first capacitor 41, and to the first port 19.

FIG. 3b

FIG. 3b depicts one embodiment of a matrix voltage clamp comprising a discharging resistor. This embodiment is identical to the embodiment shown in FIG. 3a, with the exception of the added resistor 45 electrically connected in parallel to the first capacitor 41. This embodiment is preferable over the embodiment shown in FIG. 3a, as the first capacitor 41 is discharged via the resistor 43, providing a consistent output.

FIG. 3c

FIG. 3c depicts one embodiment of a matrix voltage clamp comprising a first switch for charge recuperation. This embodiment is identical to the embodiment shown in FIG. 3a, with the exception of the added first switch 47 electrically connected in parallel to the first capacitor 41. This embodiment is preferable as the energy stored, for example from transients generated during switching, can be recuperated by the system. In this embodiment, a control system 7 preferably periodically closes the first switch 47 allowing the first capacitor 41 to discharge through the first port 19 of the matrix voltage clamp 3 and the second port 21 of the matrix voltage clamp 3.

FIG. 4a

Figure 4:
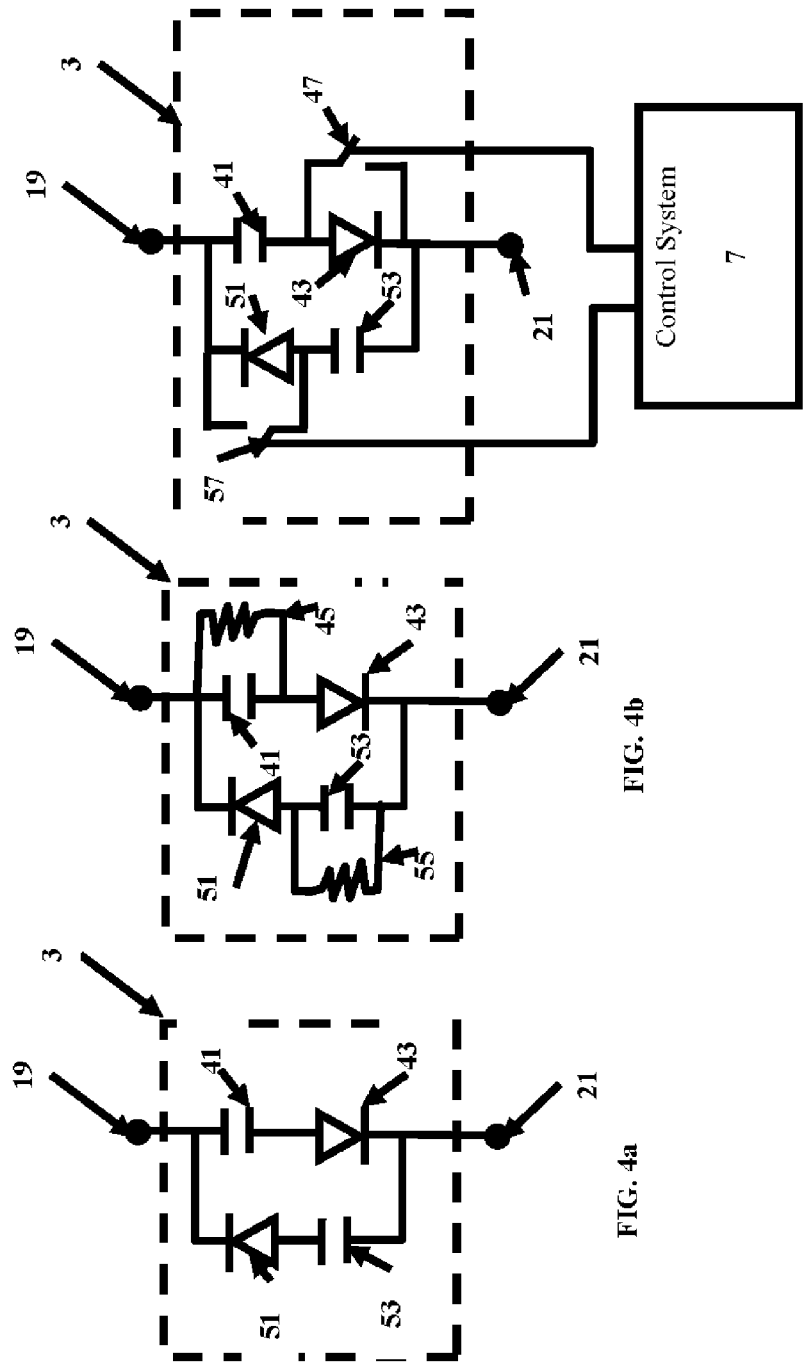
FIG. 4a depicts one embodiment of a matrix voltage clamp for positive and negative power sources.
FIG. 4b depicts one embodiment of a matrix voltage clamp for positive and negative power sources; and comprising a discharging resistor.
FIG. 4c depicts one embodiment of a matrix voltage clamp for positive and negative power sources; and comprising a switch for charge recuperation.

FIG. 4a depicts one embodiment of a matrix voltage clamp for positive and negative power sources. FIG. 4a depicts one embodiment identical to the embodiment shown in FIG. 3a, with the exception of adding a second diode 51 and a second capacitor 53. The second diode 51 and the second capacitor 53 combined duplicate the first capacitor 41 and the first diode 43, but is connected in reverse. Therefore, the second diode 51 is electrically connected to the second capacitor 53 and the first port 19 of the matrix voltage clamp 3. The second capacitor 53 is electrically connected to the second diode 51 and the second port 21 of the matrix voltage clamp 3. This embodiment is preferred over the embodiment depicted in FIG. 3a, as it is capable of handling positive or negative voltages.

When the voltage of the first port 19 exceeds the voltage of the second port 21 and the first capacitor 41, the first diode is 43 biased on. Current flows from the second port 21 through the first diode 43, through the first capacitor 41, and to the first port 19.

When the voltage across the second port 21 exceeds the voltage of the first capacitor 41 voltage and the first port 19, the second diode is 51 biased on. Current flows from the first port 19 through the second diode 51, through the second capacitor 53, and to the second port 21.

FIG. 4b

FIG. 4b depicts one embodiment of a matrix voltage clamp for positive and negative power sources; and further comprising a discharging resistor. This embodiment is identical to the embodiment shown in FIG. 4a, with the exception of the added first resistor 45 electrically connected in parallel to the first capacitor 41, and a second resistor 55 electrically connected in parallel to the second capacitor 53. This embodiment is preferable over the embodiment shown in FIG. 4a, as the capacitors (the first capacitor 41 and the second capacitor 53) are discharged via their respective resistors (first resistor 45 and second resistor 55).

FIG. 4c

FIG. 4c depicts one embodiment of a matrix voltage clamp for positive and negative power sources; and further comprising a first switch and a second switch for charge recuperation. This embodiment is identical to the embodiment shown in FIG. 4a, with the exception of a first switch 47 and a second switch 57. The first switch 47 is electrically connected in parallel to the first capacitor 41. The second switch 57 is electrically connected in parallel to the second capacitor 53. This embodiment is preferable as the energy stored, for example from transients generated during switching, can be recuperated by the system. In this embodiment, a control system 7 preferably periodically closes the first switch 47 thereby allowing the first capacitor 41 to discharge through the first port 19 of the matrix voltage clamp 3 and the second port 21 of the matrix voltage clamp 3. In this embodiment, the control system 7 preferably also periodically closes the second switch 57 thereby allowing the second capacitor 53 to discharge through the first port 19 of the matrix voltage clamp 3 and the second port 21 of the matrix voltage clamp 3.

Since current can flow into the clamp 3 through the first diode 43 and second diode 51, regardless of the state of the switches (first switch 47 and the second switch 57), the control of the clamp 3 is preferably coordinated with the load on the first port 19 and the second port 21. The switches must be in the on state for the load to be able to draw current from the capacitors (first capacitor 41 and second capacitor 53), which is necessary any time that the current being provided by the sources is less than the current demanded by the load. This is especially critical if the load duty cycles are longer than the source duty cycles, at which point the capacitors must provide the entire load current once the sources are turned off. For this reason, the active clamp preferably has the same duty cycle as the load with the longest duty cycle. Therefore, the control system 7 preferably has access to the value of the duty cycles of all the load converters. The clamp 3 must be turned off before the polarity of the first port 19 and the second port 21 changes in enough time to allow the current to drop to zero before the next half cycle. This imposes a maximum duty cycle limit on all of the converters in the system.

The clamp 3 is advantageous as it forces the current across the first port 19 and the second port 21 to reset to zero rapidly. When all of the converters are turned off, including the switches of the clamp 3, this may interrupt the current through a connected transformer, for example the transformer 101 in FIG. 8, through leakage inductance of the transformer. This would normally cause a voltage spike across the first port 19 and the second port 21, but the first diode 43 or the second diode 51 do provide an alternative current path for the current.

Figure 8:
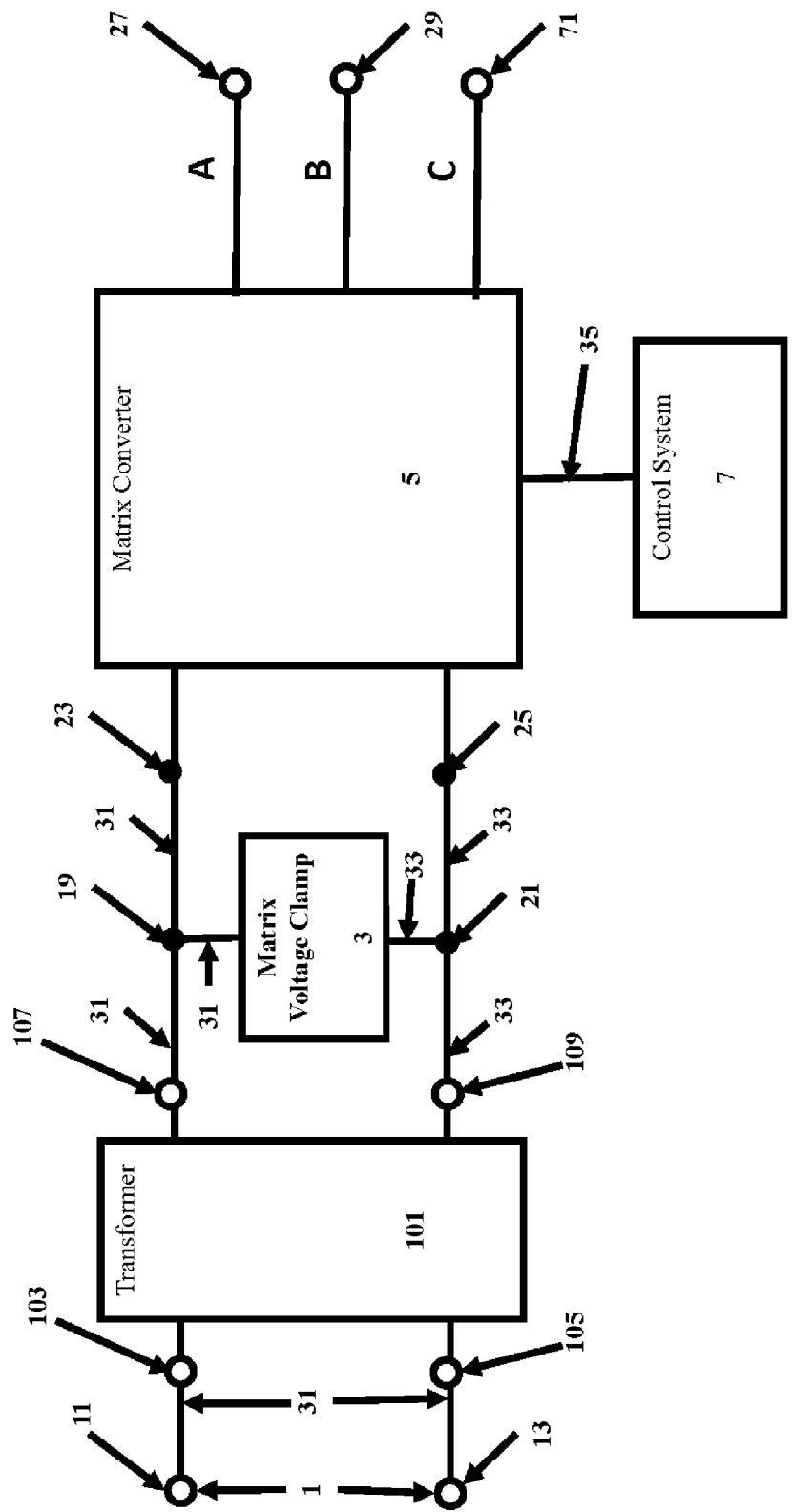
FIG. 8 depicts one embodiment of a high-frequency matrix converter with a square wave input comprising a transformer.

During the positive cycle, the first capacitor 43 of the clamp 3 provides current balancing and fixes the voltage across the first port 19 and the second port 21. When the energy sources connected to the first port 19 and the second port 21 turn off, the current passing through any connected transformers (e.g. a transformer 101 as shown in FIG. 8), the leakage inductance of the transformer has no path for flowing. This causes the voltage across the transformer, and hence the first port 19 and the second port 21, to rise, which biases on the first diode 43, which provides a current path through the first port 19 and the second port 21. Preferably, the first switch 43 is turned-off and current cannot flow through the first diode 43 from the second port 21, current cannot flow into the first capacitor 43. The current therefore flows through second capacitor 53 and the second diode 51 to complete the circuit and flow the current back to the first port 19. In addition to providing a complete current path, this process also has the effect of reversing the polarity of the voltage applied to the transformer. This entire voltage is applied to the leakage transformer, which causes the current through the leakage transformer to fall very rapidly. Once the current through the leakage transformer reaches zero, the diodes turn off and the system is ready for the next half cycle. This is preferred as it to ensures zero-current switching on many of the switching devices in the system.

FIG. 5a

Figure 5:
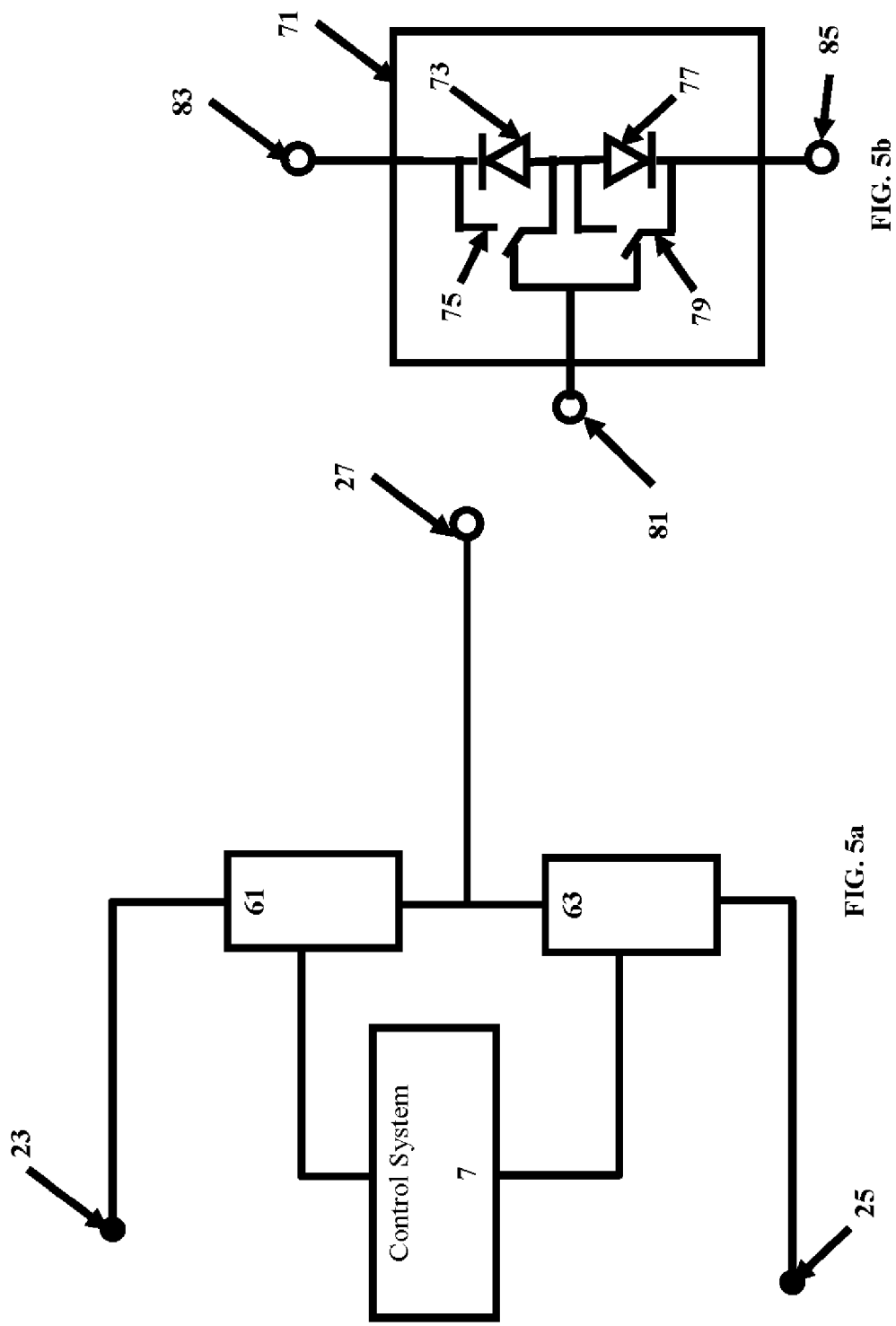
FIG. 5a depicts one embodiment of a single phase matrix converter.
FIG. 5b depicts one embodiment of a bi-directional switch.

FIG. 5a depicts one embodiment of a single phase matrix converter. In this embodiment, the matrix converter 5 comprises a first input port 23, a second input port 25, a first bidirectional switch 61, a second bidirectional switch 63, and a first output 27. A control system 7, as described above, is connected to one or more control ports of the first bidirectional switch 61 and one or more control ports of the second bidirectional switch 63, not shown for simplicity. The first bidirectional switch 61 is electrically connected to the first input port 24 and the first output port 27. The second bidirectional switch 63 is electrically connected to the second input port 25 and the first output port 27.

Bidirectional Switches (61 and 63)

The first bidirectional switch 61 is any device that is capable of electrically connecting and disconnecting the first input port 23 to the first output port 27 at the direction of the control system 7. Likewise, the second bidirectional switch 63 is any device that is capable of electrically connecting and disconnecting the second input port 25 to the first output port 27 at the direction of the control system 7. Furthermore, the first bidirectional switch 61 and the second bidirectional switch 63 each allow current to flow in either direction at the direction of the control system 7.

In one embodiment, the first bidirectional switch 61, the second bidirectional switch 63, or a combination thereof is an electrical switch, for example a relay, or semiconductor-based switch (e.g. power MOSFET, BJT, etc.). In a preferred embodiment, the first bidirectional switch 61, the second bidirectional switch 63, or a combination thereof is the bidirectional switch described in FIG. 5b.

FIG. 5b

FIG. 5b depicts one embodiment of a bi-directional switch 71. The embodiment shown in FIG. 5b comprises a first diode 73, a first switch 75, a second diode 77, a second switch 79, one or more control ports 81, a first port 83, and a second port 85.

The first diode 73, a first switch 75 and the first switch 75 are electrically connected in parallel. The second diode 77 and the second switch 79 are electrically connected in parallel. The first diode 73 is electrically connected to the second diode 77 and the first port 83. The second diode 77 is electrically connected to the first diode 73 and the second port 85. The first diode 73 and the second diode 77 are connected in series with opposing polarities.

The first switch 75 is capable of connecting or disconnecting the first port 83 to the second diode 77. Likewise, the second switch 79 is capable of connecting or disconnecting the second port 85 to the first diode 23. Preferably, the switches (the first switch 75 and the second switch 79) are one or more electrical relay switches, or semi-conductor based switch (e.g. power BJT, MOSFET, solid-state relay, etc.).

FIG. 6

Figure 6:
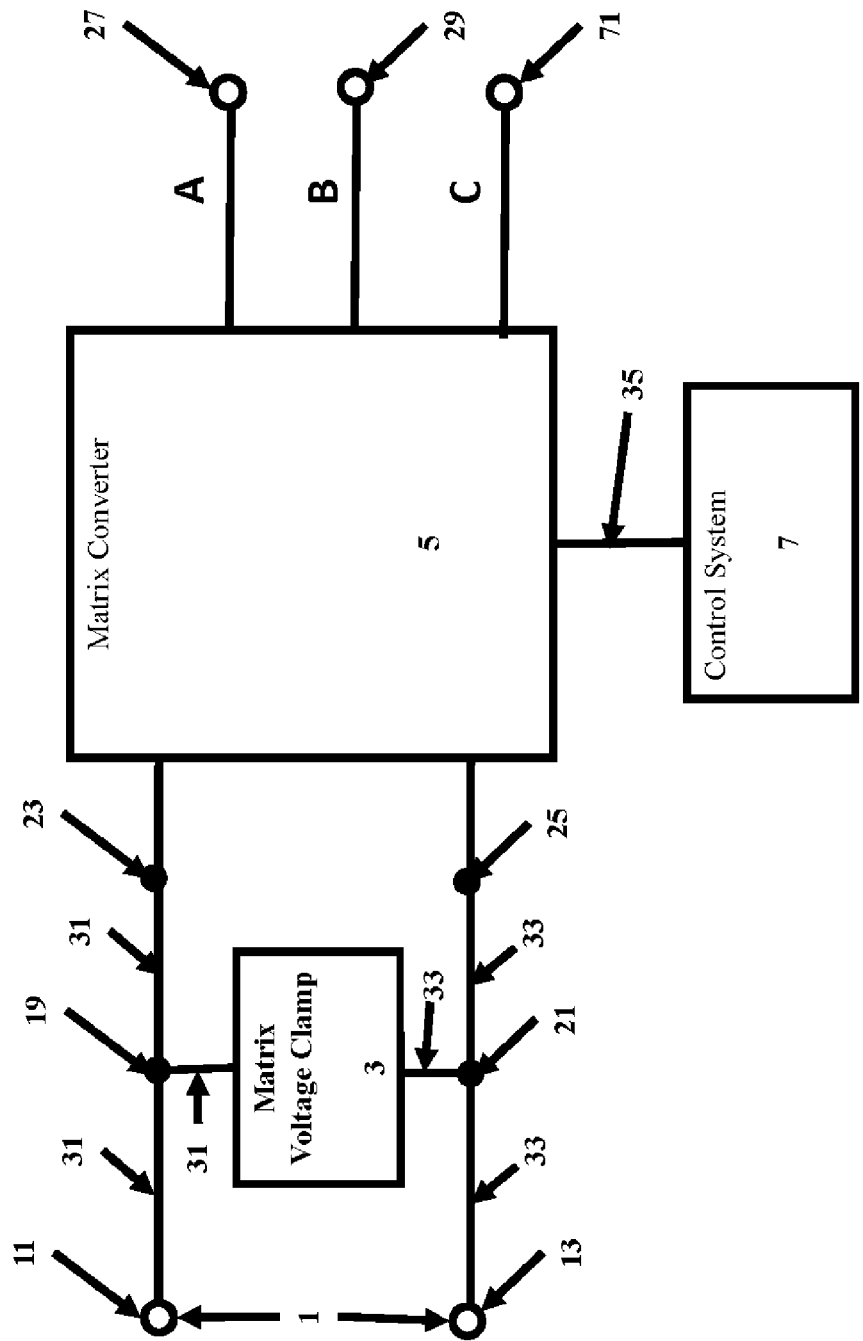
FIG. 6 depicts one embodiment of a high-frequency matrix converter with a square wave input producing a three-phase output.

FIG. 6 depicts one embodiment of a high-frequency matrix converter with a square wave input producing a three-phase output comprising a High-Frequency, Square-Wave Input 1, a matrix voltage clamp 3, a matrix converter 5, and a control system 7, as described above. The High-Frequency, Square-Wave Input comprises a first port 11, a second port 13. The matrix voltage clamp 3 comprises a first port 19, and a second port 21. The matrix converter 5 comprises a first input port 23, a second input port 25, a first output port 27, a second output port 29, and a third output port 71.

As shown, the first port 11 of the High-Frequency, Square-Wave Input 1, the first port 19 of the matrix voltage clamp 3, and the first input port 23 of the matrix converter 5 are electrically connected via one or more first wires 31. As shown in FIG. 1, the second port 13 of the High-Frequency, Square-Wave Input 1, the second port 21 of the matrix voltage clamp 3, and the second input port 25 of the matrix converter 5 are electrically connected via one or more second wires 33. The control system 7 is electrically connected to the matrix converter 5 via one or more control wires 35.

FIG. 7

Figure 7:
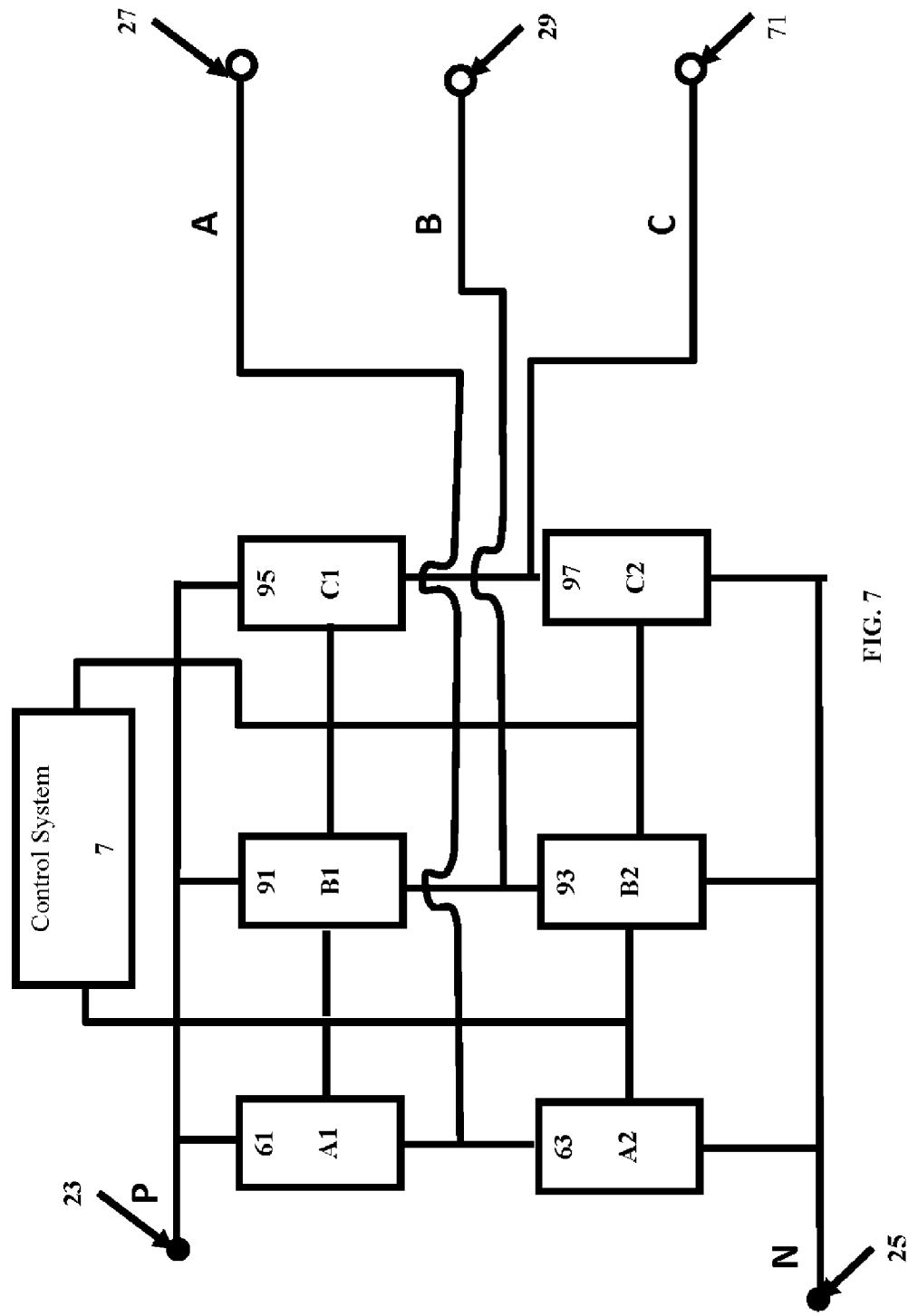
FIG. 7 depicts one embodiment of a three-phase matrix converter.

FIG. 7 depicts one embodiment of a three-phase matrix converter. In this embodiment, the matrix converter 5 comprises a first input port 23, a second input port 25, a first bidirectional switch 61, a second bidirectional switch 63, a third bidirectional switch 91, a fourth bidirectional switch 93, a fifth bidirectional switch 95, a sixth bidirectional switch 97, a first output 27, a second output 29 and a third output 71. A control system 7, as described above, is connected to one or more control ports of each of the first bidirectional switch 61, second bidirectional switch 63, third bidirectional switch 91, fourth bidirectional switch 93, fifth bidirectional switch 95, and sixth bidirectional switch 97. Each of the first bidirectional switch 61, second bidirectional switch 63, third bidirectional switch 91, fourth bidirectional switch 93, fifth bidirectional switch 95, and sixth bidirectional switch 97 are as describe above for the first bidirectional switch 61, second bidirectional switch 63, with the exception of their exterior connections.

The first bidirectional switch 61 is electrically connected to the first input port 24 and the first output port 27. The second bidirectional switch 63 is electrically connected to the second input port 25 and the first output port 27.

The third bidirectional switch 91 is electrically connected to the first input port 24 and the second output port 29. The fourth bidirectional switch 93 is electrically connected to the second input port 25 and the second output port 29.

The fifth bidirectional switch 95 is electrically connected to the first input port 24 and the third output port 71. The sixth bidirectional switch 97 is electrically connected to the second input port 25 and the third output port 71.

FIG. 8

FIG. 8 depicts one embodiment of a high-frequency matrix converter with a square wave input comprising a High-Frequency, Square-Wave Input 1, a matrix voltage clamp 3, a matrix converter 5, and a control system 7, as described above. The embodiment shown in FIG. 8 further comprises a transformer 101 comprising a first input port 103, a second input port 105, a first output port 107, and a second output port 109. The High-Frequency, Square-Wave Input comprises a first port 11, a second port 13. The matrix voltage clamp 3 comprises a first port 19, and a second port 21. The matrix converter 5 comprises a first input port 23, a second input port 25, a first output port 27, a second output port 29, and a third output port 71.

As shown in FIG. 8, the first port 11 of the High-Frequency, Square-Wave Input 1, the first port 103 of the transformer 101 are electrically connected via one or more first wires 31. The second port 13 of the High-Frequency, Square-Wave Input 1, the second port 105 of the transformer 101 are electrically connected via one or more second wires 33. The first output 107 of the transformer 101, the first port 19 of the matrix voltage clamp 3, and the first input 23 of the matrix converter 5 are electrically connected via one or more first wires 31. The second output 109 of the transformer 101, the second port 21 of the voltage clamp 3, and the second input 25 of the matrix converter 5 are electrically connected via one or more second wires 33. The control system 7 is electrically connected to the matrix converter 5 via one or more control wires 35. The control system 7 is connected to the matrix converter 5.

Transformer 101

The transformer 101 comprises a plurality of electrical coils in electromagnetic communication. Preferably, the transformer 101 comprises a first winding electrically connects a first input port and a second input of the transformer; a second winding electrically connects a first output port and a second output of the transformer; whereby the first winding and the second winding are electromagnetically connected, preferably through a metal core. Preferably, the transformer 101 is designed for high frequencies, preferably above 1 KHz, more preferably above 10 KHz.

FIG. 9

Figure 9:
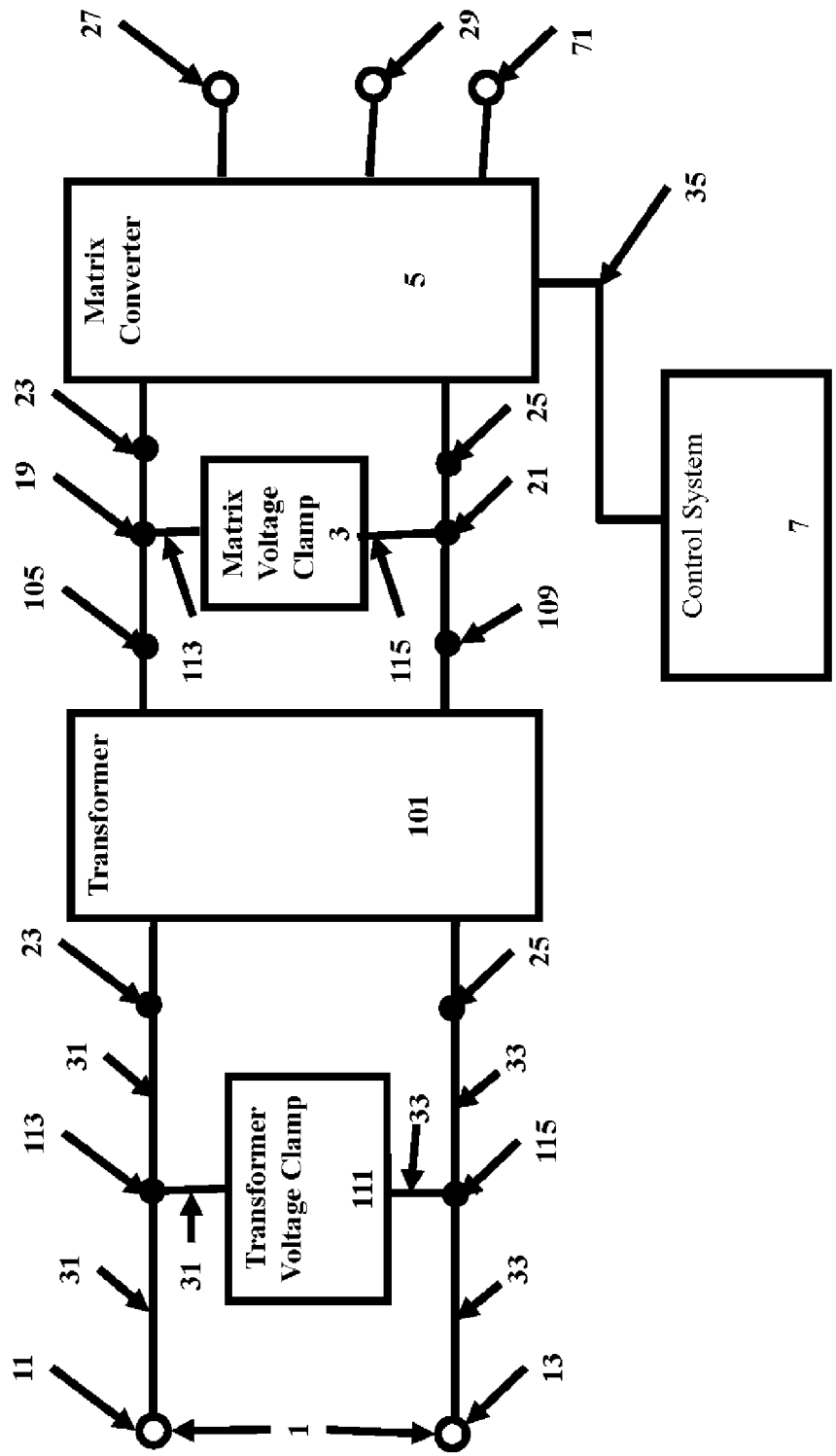
FIG. 9 depicts one preferred embodiment of a high-frequency matrix converter with a square wave input producing a three-phase output and comprising a transformer voltage clamp.

FIG. 9 depicts one embodiment of a high-frequency matrix converter with a square wave input producing a three-phase output comprising a High-Frequency, Square-Wave Input 1, a matrix voltage clamp 3, a transformer 101, a matrix converter 5, and a control system 7, as described above. The embodiment shown in FIG. 9 further comprises a transformer voltage clamp 111 comprising a first port 113, and a second port 115. The transformer voltage clamp 111 is preferable as it helps reduce transients created during switching. The High-Frequency, Square-Wave Input comprises a first port 11, a second port 13. The transformer voltage clamp 111 comprises a first port 113, and a second port 115. The matrix voltage clamp 3 comprises a first port 19, and a second port 21. The transformer voltage clamp 111 is as described above for the matrix voltage clamp 3, with the exception of its external connections. In this embodiment, the matrix converter 5 comprises a first input port 23, a second input port 25, a first output port 27, a second output port 29, and a third output port 71, as described above. In this embodiment, the matrix converter 5 produces a three-phase output; however any number of phases may be produced.

As shown in FIG. 9, the first port 11 of the High-Frequency, Square-Wave Input 1, the first port 113 of the transformer voltage clamp 111, and the first input port 103 of the transformer 101 are electrically connected via one or more first wires 31. The second port 13 of the High-Frequency, Square-Wave Input 1, the second port 115 of the transformer voltage clamp 111, and the second input port 105 of the transformer 101 are electrically connected via one or more second wires 33. The first output 105 of the transformer 101 and the first port 19 of the matrix voltage clamp 3 are electrically connected to the first input 23 of the matrix converter 5. The second output 109 of the transformer 101 and the second port 21 of the matrix voltage clamp 3 are electrically connected to the second input 25 of the matrix converter 5. The control system 7 is electrically connected to the matrix converter 5 via one or more control wires 35.

Transformer Voltage Clamp 111

The transformer voltage clamp 111 limits the voltage to a predetermined maximum voltage between the first port 11 of the High-Frequency, Square-Wave Input 1 and the second port 13 of the High-Frequency, Square-Wave Input 1 creating at least an approximation of a square wave. Other than its location in the system, the transformer voltage clamp 111 is as defined in the various embodiments described above for the matrix voltage clamp 3. The at least an approximation of a square wave is advantageous as it simplifies the operation of the matrix converter 5. Preferably, the transformer voltage clamp 111 is an active clamp, more preferably as described in FIG. 3c or FIG. 4c.

FIG. 10

Figure 10:
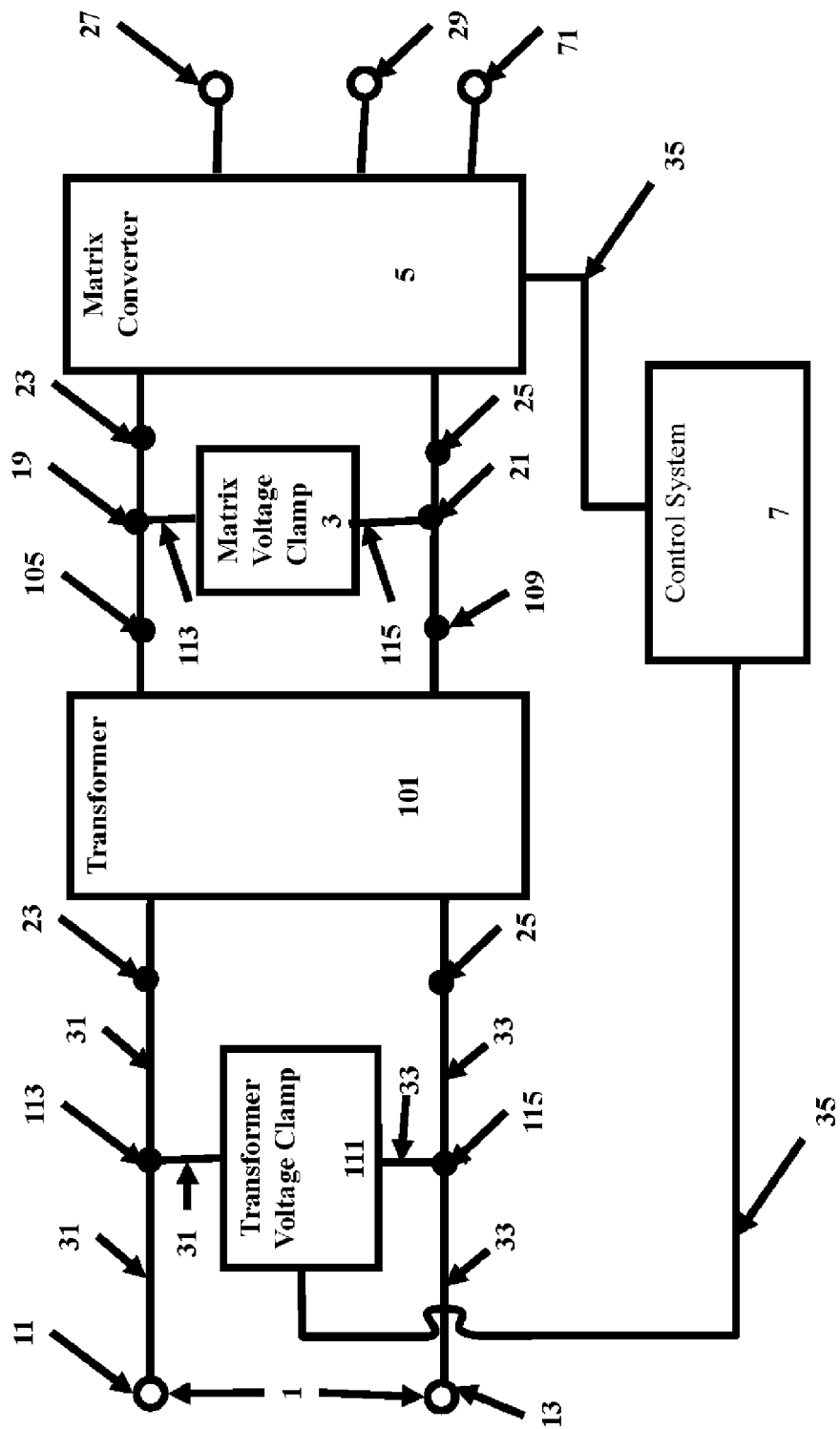
FIG. 10 depicts one preferred embodiment of a high-frequency matrix converter with a square wave input producing a three-phase output and comprising a transformer voltage clamp and whereby the transformer voltage clamp is an active clamp.

FIG. 10 depicts one embodiment of a high-frequency matrix converter with a square wave input producing a three-phase output comprising a High-Frequency, Square-Wave Input 1, a matrix voltage clamp 3, a transformer 101, a matrix converter 5, and a control system 7, as described above. The embodiment shown in FIG. 10 further comprises a transformer voltage clamp 111 comprising a first port 113, and a second port 115. This embodiment is the same as the embodiment shown in FIG. 9 and described above, except that the voltage clamp 111 is specifically depicted as an active clamp, preferably the embodiment shown in FIG. 3c or FIG. 4c. Therefore, in this embodiment, one or more control wires 35 connect the control system 7 to the transformer voltage clamp 111.

FIG. 11

Figure 11:
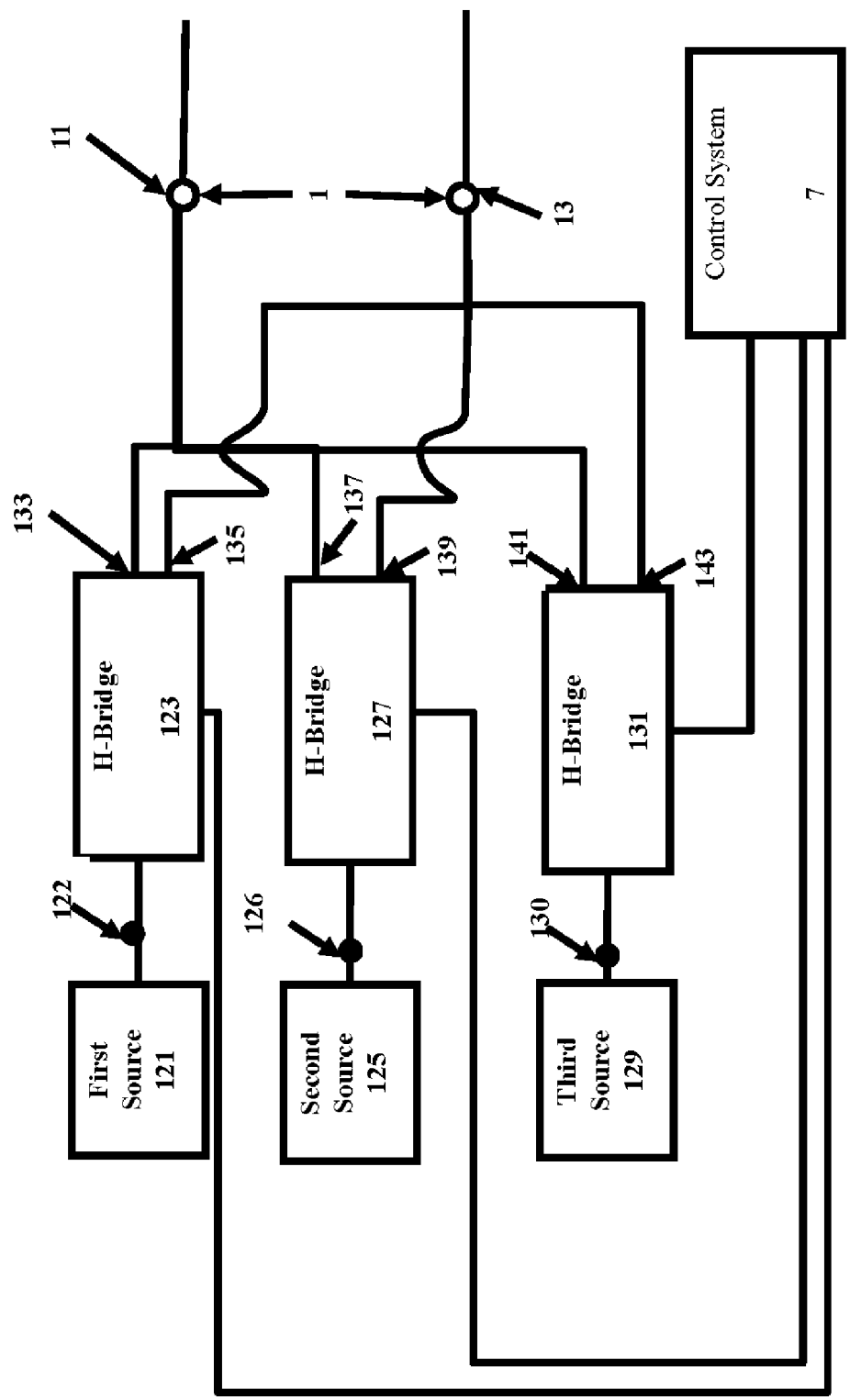
FIG. 11 depicts one embodiment of a plurality of energy sources producing a high-frequency square wave output for conversion using a matrix converter.

FIG. 11 depicts one embodiment of a plurality of energy sources producing a high-frequency square wave output for conversion using a matrix converter. This embodiment comprises a first source 121, a first H-bridge 123, a second source 125, a second H-bridge 127, a third source 129, and a third H-bridge 131. The first H-bridge 123 comprises a first input 122, a first output 133 and a second output 135. The second H-bridge 127 comprises a first input 126, a first output 137 and a second output 139. The third H-bridge 131 comprises a first input 130, a first output 141 and a second output 143.

As shown, the first source 121 is electrically connected to the first input 122 of the first H-bridge 123. The first output 133 of the first H-bridge 123 is electrically connected to the first port 11 of the High-Frequency, Square-Wave Input 1. The second output 137 of the first H-bridge 123 is electrically connected to the second port 13 of the High-Frequency, Square-Wave Input 1.

The second source 125 is electrically connected to the first input 126 of the second H-bridge 127. The first output 137 of the second H-bridge 127 is electrically connected to the first port 11 of the High-Frequency, Square-Wave Input 1. The second output 139 of the second H-bridge 127 is electrically connected to the second port 13 of the High-Frequency, Square-Wave Input 1. The control system 7 is connected to the first H-bridge 123, the second H-bridge 127, and the third H-bridge 131 via one or more control wires 35.

The third source 129 is electrically connected to first input 129 of the third H-bridge 131. The first output 137 of the third H-bridge 131 is electrically connected to the first port 11 of the High-Frequency, Square-Wave Input 1. The second output 139 of the third H-bridge 131 is electrically connected to the second port 13 of the High-Frequency, Square-Wave Input 1.

H-Bridge (123, 127, 131)

Each H-Bridge (the first H-bridge 123, second H-bridge 127, and third H-bridge 131) comprises one or more switches thereby allowing a voltage to be applied across the outputs of the H-bridge at the direction of the control system 7. For DC power source, preferably the H-Bridge is a unidirectional H-bridge thereby simplifying the design and improving efficiency.

Preferably H-bridge operations are optimized for to minimize the need for additional voltage clamps, as described above for matrix voltage clamp 3. Preferably, the system is designed to: (i) provide a short-circuit path for the boost inductor while it is being fluxed, (ii) prevent a short circuit on the common bus while a single converter is fluxing its inductor, and (iii) prevent the current through an transformer from being interrupted. This last design goal is preferably achieved by ensuring that a certain device is ready to act as a diode when the system is about to commutate so current can have continuous flow.

FIG. 12

Figure 12:
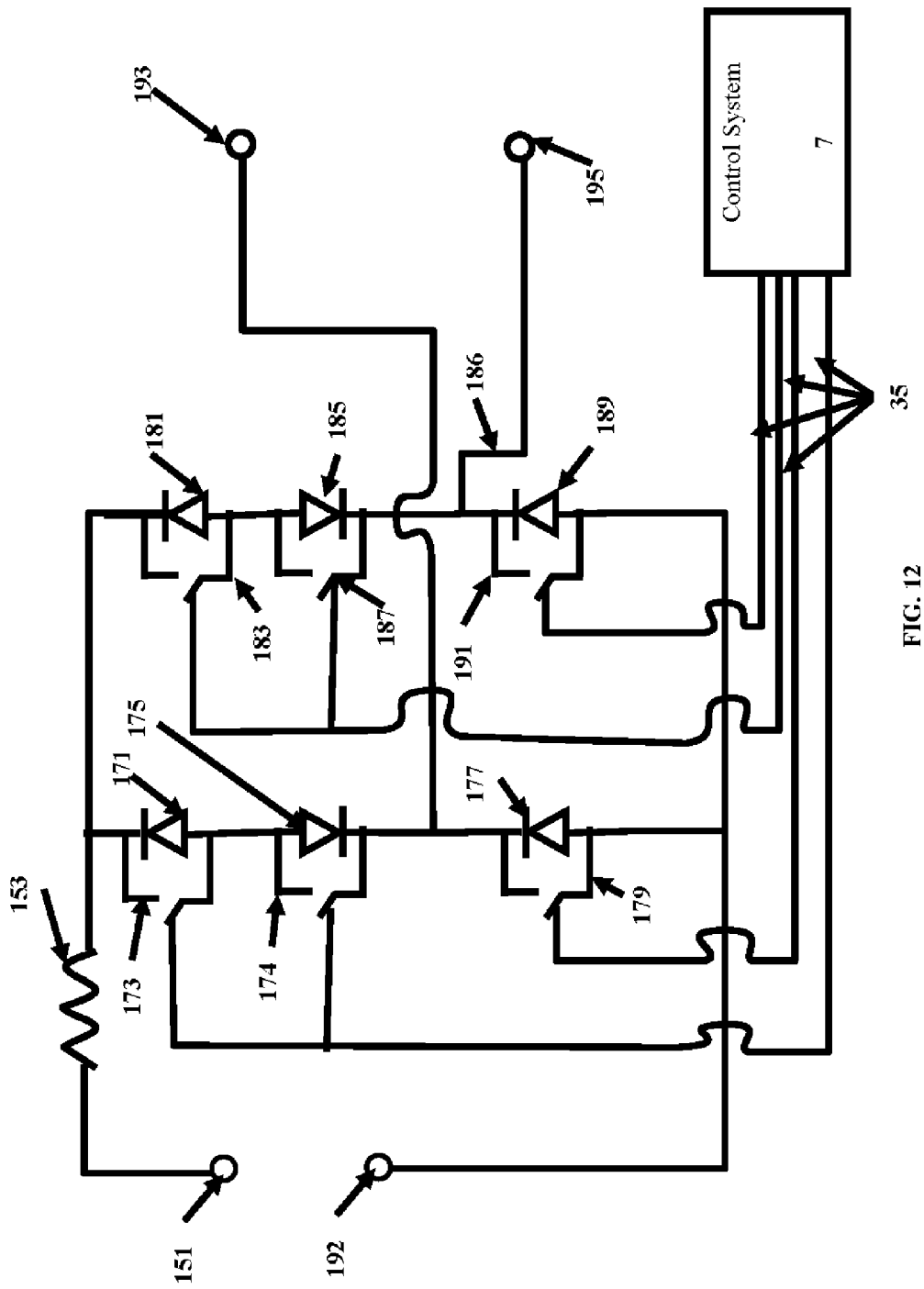
FIG. 12 shows one embodiment of a bidirectional H-Bridge.

FIG. 12 shows one embodiment of a bi-directional H-Bridge comprising a first input port 151, a second input port 192, an inductor 153, a first diode 171, a first switch 173, a second diode 175, a second switch 174, a third diode 171, a third switch 179, a fourth diode 181 and a fourth switch 183, a fifth diode 185, a fifth switch 187, a sixth diode 189, a sixth switch 191, a first output 193, and a second output 195. This embodiment is preferred over a unidirectional H-bridges, for example, the embodiment in FIG. 13, for bidirectional sources as it is capable of transforming both positive and negative voltages.

As shown, the first input port 151 is electrically connected to the inductor 153. A second port of the inductor 153 is electrically connected to a first port of the first diode 171. The first switch 173 is electrically connected to the first port of the first diode 171 and the second port of the first diode 171. The first switch 173 is also connected to the control system 7 via one or more control wires 35. A second port of the first diode 171 is electrically connected to a first port of the second diode 175. The second switch 174 is electrically connected to the first port of the second diode 175 and the second port of the second diode 175. The second switch 174 is also connected to the control system 7 via one or more control wires 35. A second port of the second diode 175 is electrically connected to the first output 193, a first port of the third diode 177. The third switch 179 is electrically connected to the first port of the third diode 177 and the second port of the third diode 177. The third switch 179 is also connected to the control system 7 via one or more control wires 35. A second port the third diode 177 is electrically connected to a second input port 192.

The second port of the inductor 153 is also electrically connected to a first port of the fourth diode 181. The fourth switch 183 is electrically connected to the first port of the fourth diode 181 and the second port of the fourth diode 181. The fourth switch 183 is also connected to the control system 7 via one or more control wires 35. A second port of the fourth diode 181 is electrically connected to a first port of the fifth diode 185. The fifth switch 187 is electrically connected to the first port of the fifth diode 185 and the second port of the fifth diode 185. The fifth switch 187 is also connected to the control system 7 via one or more control wires 35. A second port of the fifth diode 185 is electrically connected to the second output 195, a first port of the sixth diode 189. The sixth switch 191 is electrically connected to the first port of the sixth diode 189 and the second port of the sixth diode 189. The sixth switch 191 is also connected to the control system 7 via one or more control wires 35. A second port the sixth diode 189 is electrically connected to a second input port 192.

The first diode 171 and the second diode 175 are connected in reversed electrical polarity, whereby one diode will restrict the electrical current from passing in either direction. The fourth diode 181 and the fifth diode 185 are connected in reversed electrical polarity, whereby one diode will restrict the electrical current from passing in either direction. The third diode 177 and the sixth diode 189 are connected in parallel electrical polarity, whereby both diodes will restrict the electrical current flowing to or from the second input port 192 along a given current direction.

Preferably, for embodiments comprising a plurality of energy sources, the creation of a short circuit across the first output 193 and the second output 195 is avoided. In an alternate embodiment, the first output 193 and 195 are shorted, and each H-bridge of each energy source is synchronized. In an alternative embodiment, a plurality of energy sources utilize the same h-bridge.

Preferably, an energy source is electrically connected across the first input port 151 and the second input port 192 providing a DC voltage. In an alternative embodiment, the energy source produces an AC voltage. In a preferred embodiment, the energy source is a photovoltaic cell, a wind generator, geothermal converter, etc.

The inductor 153 comprises a first port and a second port and stores energy from current passing through the first port to and from the second port in its magnetic field, preferably comprising a ferromagnetic core.

The first switch 159 and the second switch 165 are as the switches described above. The control system 7 is as described above.

FIG. 13

Figure 13:
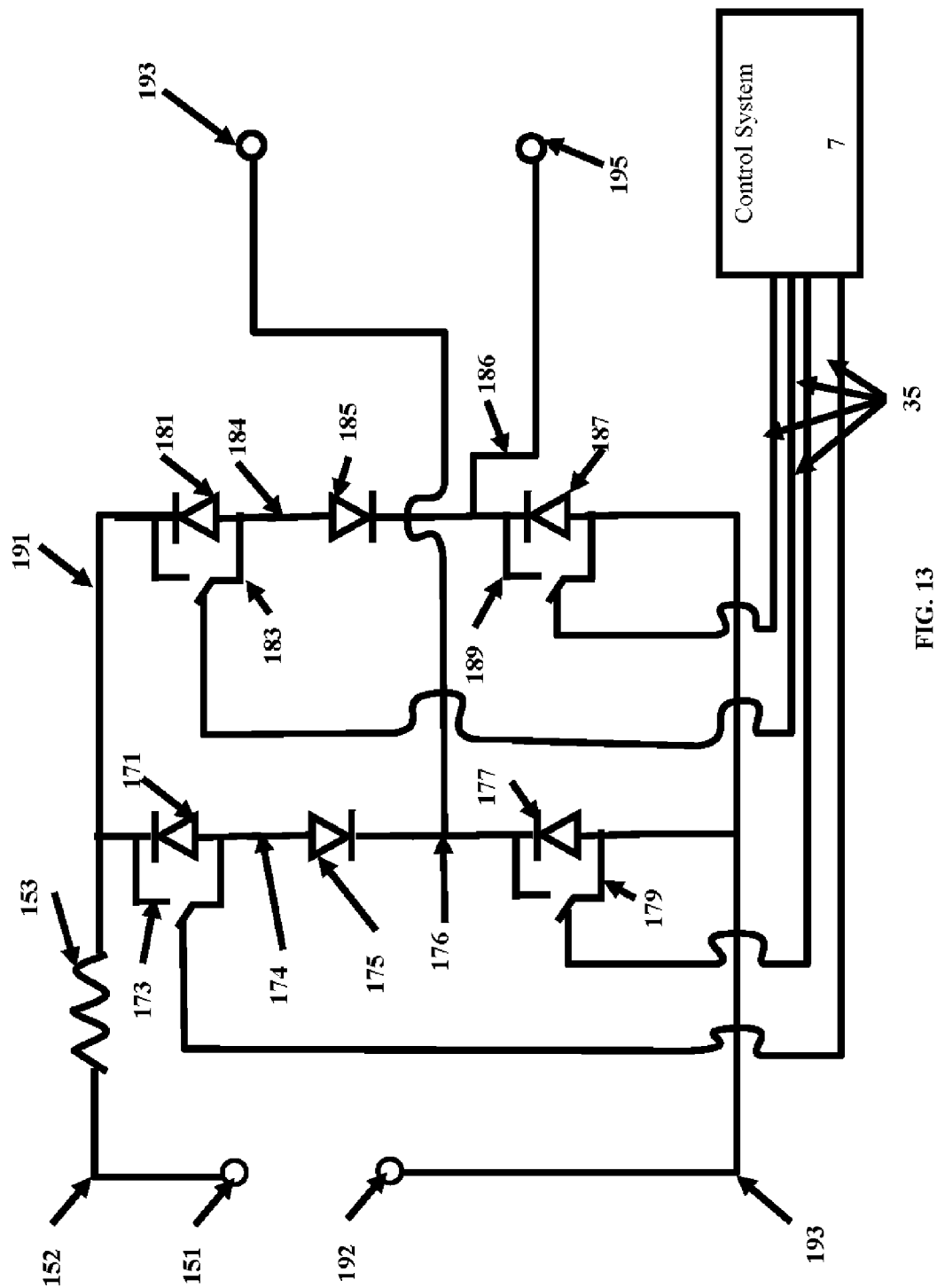
FIG. 13 shows one embodiment of a unidirectional H-Bridge.

FIG. 13 shows one embodiment of a unidirectional H-Bridge comprising the same components shown in FIG. 12, as described above, with the exception that the unnecessary second switch 174 and the fourth switch 187 in FIG. 12 is removed in the embodiment shown in FIG. 13. This embodiment is preferred over a bidirectional H-bridge, for example, the embodiment in FIG. 12, for unidirectional sources (e.g. photovoltaics, fuel cells, etc.) as is has less components.

FIG. 14

Figure 14:
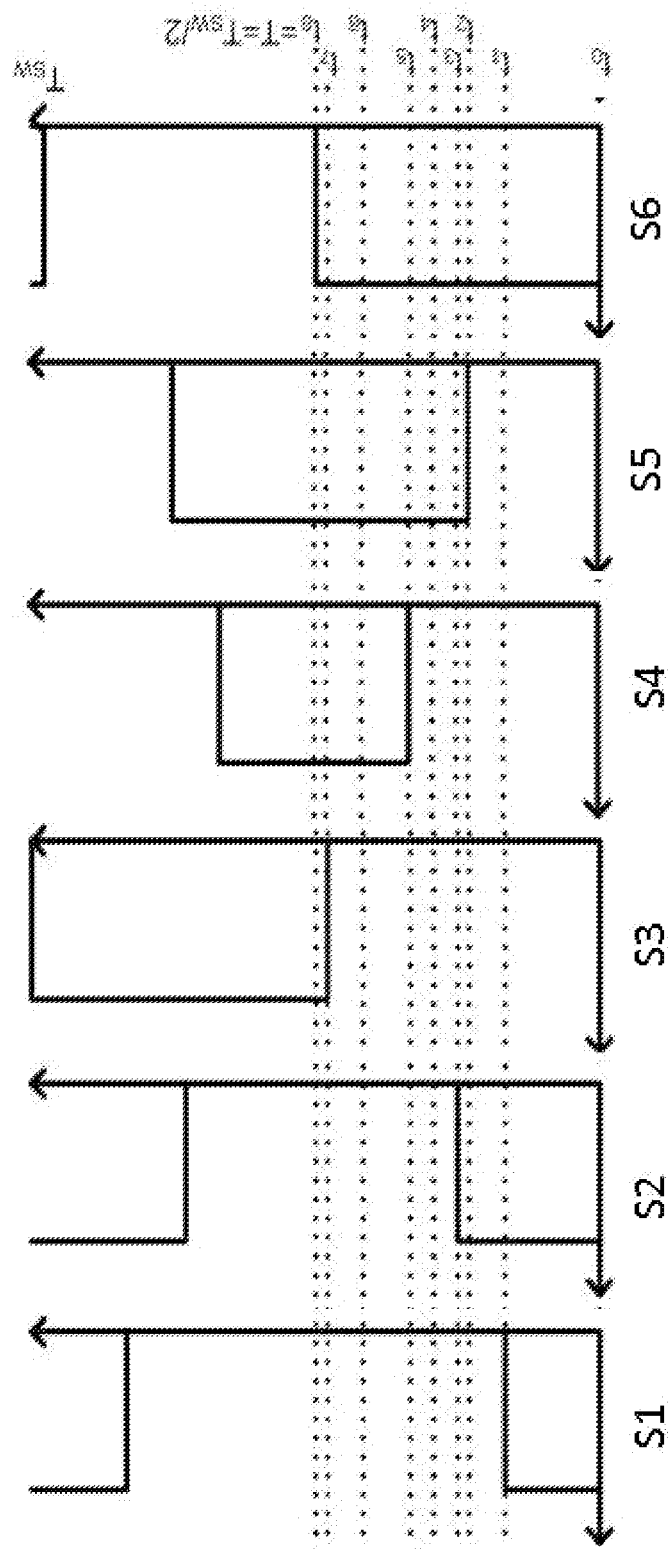
FIG. 14 depicts a preferred embodiment of control waveforms for switches of a bidirectional H-bridge, for example the embodiment shown in FIG. 12.

FIG. 14 depicts a preferred embodiment of control waveforms for switches of a bidirectional H-bridge, for example the embodiment shown in FIG. 12, when power is flowing from an energy source through the first input 151 in FIG. 12. Preferably, to increase the voltage output, the inductor (153 in FIG. 12) is fluxed, whereby a short is created through the first diode (171 in FIG. 12) and the first switch (179 in FIG. 12), the second diode 175, the second switch (174 in FIG. 12), the third diode (177 in FIG. 12), the third switch (179 in FIG. 12), or a combination thereof. This short circuit provides the free-wheeling path for the boost inductor current while it is being fluxed. The period when the H-bridge is not fluxed is called the on-state, while the period when the H-bridge is fluxed is called the free-wheeling state. The value of the output voltage depends on the relative length of these two states and on the input voltage, where a longer on-state results in a shorter output voltage. If ton represents the length of the on-state and $T_{sw}$ is the sum of the on-state and the free-wheeling state for one switching interval, then the voltage ratio $V_{out}/V_{in}$ is given by the boost converter voltage ratio equation:

$$\frac{V_{Out}}{V_{IN}} = \frac{1}{1 - \frac{t_{on}}{T_{sw}}} = \frac{1}{1 - D} \tag{3-1}$$

Preferably, the H-bridge is controlled to avoid a short circuit at its output (the first output 193 and the second output 195 in FIG. 12). In a preferred embodiment, a switching order is determined to provide a short-circuit path for the inductor current during the free-wheeling state while at the same time presenting an open-circuit to the output so that any other H-Bridges may operate according to their own requirements. In short, this is accomplished by turning on only one output of the H-bridge to provide a short circuit to the boost inductor while the other output is turned off, providing the open circuit to the output. This switching order which implements this scheme is shown in FIG. 14. FIG. 14 gives the control signals for all of the switches in the H-bridge over a single switching period. FIG. 14 shows each of the device switching actions for the positive half cycle (the half of the cycle where the converter applies a positive voltage to the output); the negative half cycle has symmetrical operation.

In FIG. 14, $S_2$ refers to the second switch 174 in FIG. 12. $S_1$ refers to the first switch 173 FIG. 12. In FIG. 14, $S_6$ refers to the sixth switch 191 in FIG. 12. In FIG. 14, $S_5$ refers to the fifth switch 187 in FIG. 12. $S_4$ refers to the fourth switch 183 in FIG. 12. In FIG. 14, $S_3$ refers to the third switch 179 in FIG. 12. These switches ($S_1$, $S_2$, $S_3$, $S_4$, $S_5$, $S_6$) are used to provide an output voltage $V_{out}$, across the outputs (first output (167 in FIG. 12) and the second output (169 in FIG. 12)).

At time t0, S2, S1, and S6 are all on, thereby providing a voltage, $V_{out}$, across the outputs.

At time $t_1$, S1 is turned off, beginning the transition to the free-wheeling period, where the voltage is increased. The positive voltage Vout is still applied to the outputs and the inductor (153 in FIG. 12) current is still passed through the antiparallel diode of S1. The first output (167 in FIG. 12) is no longer forcibly connected to the H-bridge.

At time t2, S5 is turned on. The antiparallel diode of S4 prevents a short circuit from forming immediately, but since first output (193 in FIG. 12) is at a higher voltage potential than the second output (195 in FIG. 12), this antiparallel begins to commutate on. This causes the voltage of the first output (193 in FIG. 12) to decrease, and as a result the antiparallel diode of S1 commutates off.

By time t3, the antiparallel diode of S4 has naturally commutated on; and the antiparallel diode of S1 has naturally commutated off. Therefore, a shortcircuit path is provided through the fourth diode (181 in FIG. 12) and the fifth diode (185 in FIG. 12). The antiparallel diodes of S1 and S3, in the meantime, present an open circuit to outputs and allow any other electrical components connected to the output to operate according to its own timing. Since the antiparallel diodes of S1 and S3 prevent conduction, S2 turns off under a zero-current condition at t4. S4 turns on at t5, completing the transition to the free-wheeling period.

By time t6, which is shortly before the beginning of the negative half cycle beginning at TSW/2, any other converters preferably have transitioned to their own free-wheeling cycle. Preferably, converters on the outputs operate with the same switching frequency and transition from the positive half cycle to the negative half cycle at the same time so that the same voltage is impressed on the outputs by all the converters, preventing short circuits. In one embodiment, the converters operate with different timing within the positive and negative half cycles, allowing different duty cycles and voltage conversion ratios.

At time t7, S3 turns on. This impresses a short circuit on the common HF bus through S3 and S6, which is the other reason that all of the converters must have the same switching frequency and half cycle transition time, since it will be forced upon them anyway by the operation of a single converter. If the proper timing is observed, however, no problems will arise since all converters are disconnected from the common bus by this time. Turning on S3 prepares the converter so that when S6 is turned off at t8 (T or TSW/2), there is a path for the current available through S5, S4, and S3, preventing the boost inductor current from interrupting and causing a large inductive kick voltage. This is the beginning of the negative half cycle where the converter imposes Vout with a negative polarity on the outputs and passes the boost inductor current idc1 with a negative polarity on to the load. This is the parallel of the situation seen at the beginning of the positive half cycle at time t0.

The voltage conversion ratio of the boost converter is the same as for a standard boost converter given in equation (3-1). The duty cycle D is the duration ton of the freewheeling state divided by the duration T of the half cycle, which is equal to TSW/2, half the switching frequency interval. The freewheeling state begins at t3 when the antiparallel diodes of S1 and S4 naturally commutate so that idc1 no longer flows to the outputs but instead flows through the right-hand leg of the converter. In practice, this commutation happens shortly after device S5 is turned on at t2, so the duration of ton is equal to (TSW/2)−t2. A short overlap period to overlap must be provided between the turn-on of one device and the turn-off of the next in order to ensure that the boost inductor current has a continuous conduction path and does not generate a large inductive kick voltage. This is the reason for the slightly staggered control signals for the devices in FIG. 14. Implementing these signals uses the following equations:

$$S2=0 \text{ for } t_{on}+t_{overlap} \leq t \leq t_{on}+0.5T_{SW} \text{ and } 1 \text{ otherwise} \quad (3\text{-}2)$$

$$S1=0 \text{ for } t_{on}-t_{overlap} \leq t \leq t_{on}+0.5T_{SW}+2t_{overlap} \text{ and } 1 \text{ otherwise} \quad (3\text{-}3)$$

$$S6=0 \text{ for } 0.5t_{SW} \leq t \leq t_{SW}-t_{overlap} \text{ and } 1 \text{ otherwise} \quad (3\text{-}4)$$

$$S5=1 \text{ for } t_{on} \leq t \leq t_{ON}+0.5T_{SW}+t_{overlap} \text{ and } 0 \text{ otherwise} \quad (3\text{-}5)$$

$$S5=1 \text{ for } t_{on}+2t_{overlap} \leq t \leq t_{oN}0.5T_{SW}-t_{overlap} \text{ and } 0 \text{ otherwise} \quad (3\text{-}6)$$

$$S3=0 \text{ for } 0 \leq t \leq t_{ON}+0.5T_{SW}-t_{overlap} \text{ and } 1 \text{ otherwise} \quad (3\text{-}7)$$

Preferably, the unidirectional H-bridge has the same control and the same voltage conversion ratio as the bidirectional H-bridge, except it does not possess the series switching devices S1 and S4. It has a single series diode in these positions instead which have the same functionality as the antiparallel diodes of S1 and S4 shown above. The control of this converter does not require equations (3-3) or (3-6), but otherwise utilizes the same control equations described above.

When the converter enters the positive half cycle at time zero, the first switch (173 in FIG. 12) and the second switch (174 in FIG. 12) has been on for a (relatively) long time and third switch (179 in FIG. 12) has just turned-on. The third diode (177 in FIG. 12) has turned on, and current is flowing from the first input (151 in FIG. 12) to the first output (193 in FIG. 12). S1 turns on at time

FIG. 15

Figure 15:
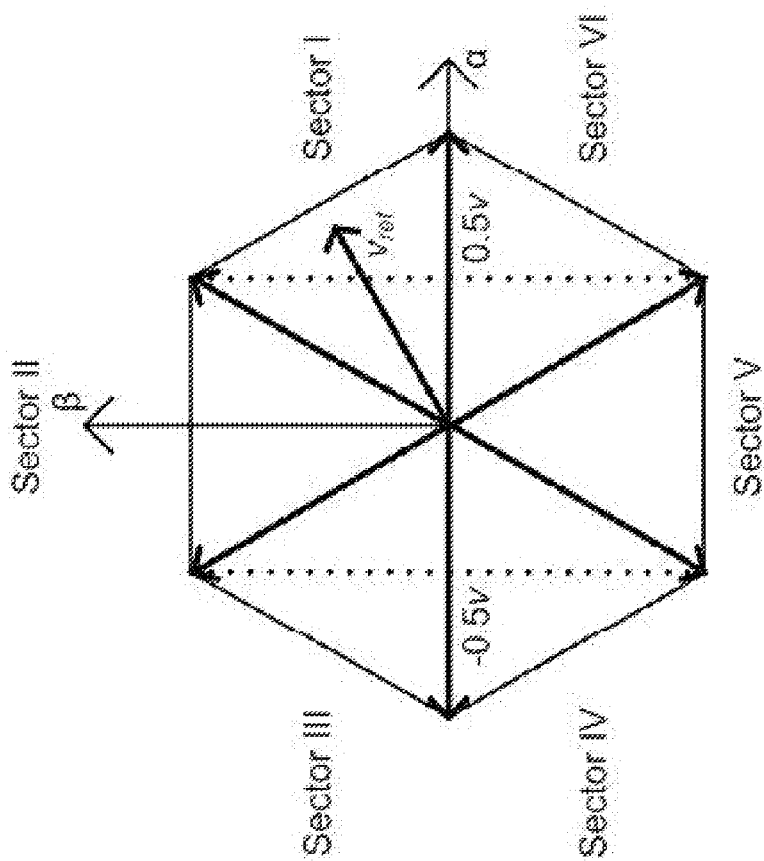
FIG. 15 depicts the SVPWM Hexagon used by the control system in the operation of the matrix converter.

FIG. 15 depicts the SVPWM Hexagon used by the control system in the operation of the matrix converter. This hexagon is constructed by first determining the possible switching values of the switches in the matrix converter, as shown in FIG. 7. Table 1 below shows the switch positions for each of the eight possible vectors that avoid electrically shorting the input of the matrix converter and avoid putting an open circuit in series with an inductor. For the first bidirectional switch 61, the third bidirectional switch 91, and the fifth bidirectional switch 95, a "1" for the bi-directional switch is indicative of an electrical connection through the corresponding bidirectional switch to the first input port 23. Likewise, for the second bidirectional switch 63, the fourth bidirectional switch 93, and the sixth bidirectional switch 97, a "1" for the bi-directional switch is indicative of an electrical connection through the corresponding bidirectional switch to the second input port 25. A "0" is indicative of the switch in its off position electrically insulating its inputs. The output, VAN (voltage between the first output port 27 and the second input port 25), VBN (voltage between the second output port 29 and the second input port 25), and VCn (voltage between the third output port 71 and the second input port 25) are also provide for clarity. A voltage value of Vin is dependent upon the one or more voltage clamps used, and the polarity of the input square wave across the first input port 23 and the second input port 25.

TABLE 1

| Vector | A1 | A2 | B1 | B2 | C1 | C2 | VAN | VBN | VCN |
|---|---|---|---|---|---|---|---|---|---|
| V1 | 1 | 0 | 0 | 1 | 0 | 1 | ±Vin | 0 | 0 |
| V2 | 1 | 0 | 1 | 0 | 0 | 1 | ±Vin | ±Vin | 0 |
| V3 | 0 | 1 | 1 | 0 | 0 | 1 | 0 | ±Vin | 0 |
| V4 | 0 | 1 | 1 | 0 | 1 | 0 | 0 | ±Vin | ±Vin |
| V5 | 0 | 1 | 0 | 1 | 1 | 0 | 0 | 0 | ±Vin |
| V6 | 1 | 0 | 0 | 1 | 1 | 0 | ±Vin | 0 | ±Vin |
| V7 | 1 | 0 | 1 | 0 | 1 | 0 | ±Vin | ±Vin | ±Vin |
| V0 | 0 | 1 | 0 | 1 | 0 | 1 | 0 | 0 | 0 |

Once the voltage outputs are known, the following equations may be used to determine the phase to neutral voltages for each switching state:

$$VAN = \tfrac{2}{3} VAN - \tfrac{1}{3}(VBN+VCN) \quad (\text{EQ. 1})$$

$$VBC = \tfrac{2}{3} VBN - \tfrac{1}{3}(VAN+VCN) \quad (\text{EQ. 2})$$

$$VCN = \tfrac{2}{3} VCN - \tfrac{1}{3}(VAN+VBN) \quad (\text{EQ. 3})$$

The line to line voltages can then be found by:

$$VAB = VAN - VBN = VAN - VBN \quad (\text{EQ. 4})$$

$$VBC = VBN - VCN = VBN - VCN \quad (\text{EQ. 5})$$

$$VCA = VCN - VAN = VCN - VAN \quad (\text{EQ. 6})$$

Finally, the voltages are converted to a stationary alpha-beta reference frame, which is preferred as it simplifies the analysis and control of the matrix converter. The three-phase voltages become, in the alpha-beta reference frame, a vector with a constant magnitude and time-varying angle. The control signal can then be represented as a vector with a constant magnitude and time-varying angle which moves past the vectors of the various switch states. Preferably, the Clarke transform, preserving constant power, is used to convert the phase voltages to the alpha-beta reference frame, resulting in the hexagon shown in FIG. 15.

Operation of the Matrix Converter

The operation of the Matrix converter is designed to prevent electrical shorts, while producing a PVVM (pulsed-width-modulated) output. Preferably, this is controlled by the control system. After the SVPWM Hexagon is generated as described above. The control system receives the voltage reference. The alpha/beta domain is determined for the received voltage reference. The lengths of the alpha and beta components fo the reference voltage is used to determine which sector of the SVPWM Hexagon the reference vector lies in. Predetermined control signals for each switch of the matrix converter sector are then determined using the alpha and beta components for the reference voltage and the SVPWM Hexagon.

The first step to implementing the SVPWM switching scheme is to identify the Sector of operation. The SVPWM hexagon, shown in FIG. 15, divides the control space into six equal triangles, each occupying 60 degrees of the space. Sector 1 occurs from 0 to 60°, Sector 2 from 60° to 120°, Sector 3 from 120° to 180°, Sector 4 from 180° to 240°, Sector 5 from 240° to 300°, and Sector 6 from 300° to 360°. This is the typical hexagon used in SVPWM notation. The sector wherein the reference vector lies can be found by determining the angle of the reference vector and comparing it to the angle borders of each sector is found as described in the process below.

The angle of the reference vector can be determined from the alpha- and beta components of the reference vector, though this method involves solving the tangent function which can be computationally intensive. An alternative method is to use the magnitudes of the alpha and beta components of the reference vector, which are normally readily available from the outer loop controller. It should be noted that at the counterclockwise border of Sector 1 and the clockwise border of Sector 2, 60° and 300° respectively, the alpha component of any vector is equal to one half of its magnitude. Similarly, at the clockwise border of Sector 3 and the counterclockwise border of Sector 4, the alpha component of any vector is equal to negative one half of its magnitude. In Sectors 1 through 3, the beta component of any vector is positive, while in Sectors 4 through 6, the beta component of any vector is negative. The reference vector is in Sector 1, therefore, when the alpha component is greater than 0.5*m and the beta component is positive. It is in Sector 2 when the alpha component is between 0.5*m and −0.5*m and the beta component is positive. It is in Sector 3 when the alpha component is less than −0.5*m and the beta component is positive. It is in Sector 4 when the alpha component is less than −0.5*m and the beta component is negative. It is in Sector 5 when the alpha component is between 0.5*m and −0.5*m and the beta component is negative. Finally, it is in Sector 6 when the alpha component is greater than 0.5*m and the beta component is positive. This information, along with the appropriate angle of the reference vector in polar coordinates, is summarized in Table 2 below.

TABLE 2

| Sector | Alpha Component | Beta Component | Phase Angle |
|---|---|---|---|
| 1 | Vrefα > 0.5 m | Vrefβ > 0 | 0 < wt < 60 |
| 2 | −0.5 m < Vrefα < 0.5 m | Vrefβ > 0 | 60 < wt < 120 |
| 3 | Vrefα < −0.5 m | Vrefβ > 0 | 120 < wt < 180 |
| 4 | Vrefα < −0.5 m | Vrefβ < 0 | 180 < wt < 240 |
| 5 | −0.5 m < Vrefα < 0.5 m | Vrefβ < 0 | 240 < wt < 300 |
| 6 | Vrefα > 0.5 m | Vrefβ < 0 | 300 < wt < 360 |

The next step is generating the duty cycles Di, Dj, D1, and D2 for the switching patterns. The duty cycles for the ith and jth vectors can be calculated from Eq. 8 and Eq. 9, but to do so the angle θ between the reference vector and the ith vector must be calculated. If the angle wt of the reference vector is known, θ can be calculated by subtracting the angle of the ith vector from wt. The ith vector is the counterclockwise border of each Sector, which is given in Table 4. From the table, the angle of the ith vector is 0° for Sector 1, 60° for Sector 2, 120° for Sector 3, 180° for Sector 4, 240° for Sector 5, and 300° for Sector 6. If the angle of the ith vector as given above is defined as θi, then θ can be calculated from:

$$\theta = wt - \theta i \quad (\text{Eq. 7})$$

Once the angle is found, the duty cycle for each vector in the control can be found using the following equations, whereby Vcl is the maximum voltage limited by the one or more voltage clamps, Vφ is the desired magnitude of the phase to neutral voltage, set either by the user or a higher level controller, and e is equal to the reference angle subtracted from the upper bound of the sector wherein the reference vector lies, converted to radians, and has a value between 0 and π/3.

$$D_i = \frac{3}{2} \frac{V\varphi}{Vcl} \operatorname{Sin}(\theta) \quad (\text{EQ. 8})$$

$$D_j = \frac{3}{2} \frac{V\varphi}{Vcl} \operatorname{Sin}\!\left(\frac{\pi}{3} - \theta\right) \quad (\text{EQ. 9})$$

$$m = \frac{V\varphi}{Vcl} \quad (\text{EQ. 10})$$

Once θ is known, Di and Dj can be calculated from Eq. 8 and Eq. 9, then D1 and D2 can be obtained using:

$$D_1 = \begin{cases} D_j, & \text{Sector} = 1, 3, \text{ or } 5 \\ D_i, & \text{Sector} = 1, 3, \text{ or } 5 \end{cases} \quad \text{(Eq. 11)}$$

$$D_2 = D_i + D_j \quad \text{(Eq. 12)}$$

The next step in implementing the control of the proposed converter is to generate the switching patterns. Following the descriptions of the patterns turn-on and turn-off times, the three patterns can be expressed in equation form as:

$$P_1 = 0 \text{ for } T_1 \le t \le T_1 + \frac{T_{sw}}{2} \text{ and } 1 \text{ otherwise} \quad \text{(Eq. 13)}$$

$$P_2 = 0 \text{ for } T_2 \le t \le T_2 + \frac{T_{sw}}{2} \text{ and } 1 \text{ otherwise} \quad \text{(Eq. 14)}$$

$$P_0 = 0 \text{ for } 0 \le t \le \frac{T_{sw}}{2} \text{ and } 1 \text{ otherwise} \quad \text{(Eq. 15)}$$

The variable T1 in Eq. 13 is equal to D1 multiplied by Tsw, while the variable T2 in Eq. 14 is equal to D2 multiplied by Tsw. Eq. 13, Eq. 14, and Eq. 15 define the switching states for the upper devices in each phase leg. The lower devices in each phase leg have a complementary signal so that the upper and lower devices are never on at the same time.

Once the control signals for each pattern have been generated, they are routed to each phase leg as indicated in Table 3 below. The Sector of operation, as previously determined, is cross-referenced with each phase leg to find the pattern that provides the control for that phase leg, then the control signals generated in Equations 13 to 15 are sent to the upper devices in the indicated phase leg. The lower devices receive the complementary control signal.

TABLE 3

| Leg | Sector 1 | Sector 2 | Sector 3 | Sector 4 | Sector 5 | Sector 6 |
|---|---|---|---|---|---|---|
| A | P2 | P1 | P0 | P0 | P1 | P2 |
| B | P1 | P2 | P2 | P1 | P0 | P0 |
| C | P0 | P0 | P1 | P2 | P2 | P1 |

Preferably, the control system is configured to ensure that the input voltage source is never short-circuited and that the output filter inductors are never open-circuited. Preferably, the commutation from the upper to the lower device on a phase leg is accomplished by the natural commutation of the diodes rather than by forced switching action. Correct configuration and switching control can ensure that the diode on the upper device and the diode on the lower device can never be naturally commutated on at the same time, so allowing these two diodes to control the commutation of current from the upper device to the lower device ensures that there is never a short circuit. At the same time, any condition that would make it so that the currently active diode cannot carry the current would produce a voltage rise on the filter inductor which would naturally bias on the other diode. This ensures a smooth transition of the current from the lower device to the upper device on a phase leg.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A device for producing an alternating current output voltage from a high-frequency, square-wave input voltage comprising:
   a. a high-frequency, square-wave input, a matrix converter, and a control system;
   b. said high-frequency, square-wave input comprising a first port and a second port;
   c. said matrix converter comprising a first input port, a second input port, a plurality of electrical switches, and an output;
   d. said first port of said high-frequency input electrically connected to said first port of said matrix converter;
   e. said second port of said high-frequency input electrically connected to said second port of said matrix converter;
   f. said control system connected to each said electrical switch of said matrix converter; said control system comprising a voltage detector electrically connected to said first input of said matrix converter and said second input of said matrix converter;
   g. said control system configured to operate each said electrical switch of said matrix converter converting a high-frequency, square-wave input voltage across said first input port of said matrix converter and said second input port of said matrix converter to an alternating current output voltage at said output of said matrix converter; said alternating current output have a frequency less than the frequency of said high-frequency, square-wave input voltage;
   h. a matrix voltage clamp;
   i. said matrix voltage clamp comprising a first port and a second port;
   j. said matrix voltage clamp limiting the voltage across said first port of said matrix voltage clamp and said second port of said matrix voltage clamp to a predetermined maximum voltage;
   k. said first port of said matrix voltage clamp, said first port of said high-frequency input, and said first port of said matrix converter electrically connected to each other; and
   l. said second port of said matrix voltage clamp, said second port of said high-frequency input, and said second port of said matrix converter electrical connected to each other;
   m. wherein said matrix voltage clamp is a passive clamp comprising:
      i. a first diode, a first capacitor, a second diode, and a second capacitor;
      ii. said first diode of said matrix voltage clamp and said first capacitor of said matrix voltage clamp electrically connected in series across said first port of said matrix voltage clamp and said second sort of said matrix voltage clamp;

iii. said second diode of said matrix voltage clamp and said second capacitor of said matrix voltage clamp electrically connected in series across said first port of said matrix voltage clamp and said second port of said matrix voltage clamp; and iv. said second diode electrically connected in the polarity reversed from the polarity of said first diode across said first port of said matrix voltage clamp and said second port of said matrix voltage clamp.

2. The device for producing an alternating current output voltage from a high-frequency, square-wave input voltage of claim 1 further comprising:

a. a transformer,
b. said transformer comprising a first input port, a second input port, a first output port, and a second output port;
c. said transformer comprising a first winding electrically connecting said first input port and said second input port;
d. said transformer comprising a second winding electrically connecting said first output port and said second output port;
e. said first winding in electromagnetic communication with said second winding;
f. said first port of said high-frequency, square-wave input electrically connected to said first input port of said transformer;
g. said first output port of said transformer electrically connected to said first input port of said matrix converter;
h. said second port of said high-frequency, square-wave input electrically connected to said second input port of said transformer; and
i. said second output port of said transformer electrically connected to said second input port of said matrix converter.

3. The device for producing an alternating current output voltage from high-frequency, square-wave input of claim 1 further comprising a first H-bridge comprising:

a. a first input port, a second input port, a first inductor, first diode, a second diode, a first electrical switch, a second electrical switch, a third diode, a third electrical switch, a fourth diode, a fourth electrical switch, a fifth diode, a sixth diode, a fifth electrical switch, and a sixth electrical switch, a first output, and a second output;
b. said first inductor, first diode, second diode, and third diode electrically connected in series across said first input port of said first H-bridge and second input port of said first H-bridge;
c. said first electrical switch electrically connected across said first diode;
d. said first electrical switch connected to said control system;
e. said second electrical switch electrically connected across said second diode;
f. said second electrical switch connected to said control system;
g. said third electrical switch electrically connected across said third diode;
h. said third electrical switch connected to said control system;
i. said first diode electrically connected in the polarity reversed from the polarity of said second diode across said first input port of said first H-bridge and said second input port of said first H-bridge;
j. said first output electrically connected between said second diode and said third diode;
k. said first inductor, fourth diode, fifth diode, and sixth diode electrically connected in series across said first input port of said first H-bridge and second input port of said first H-bridge;
l. said fourth electrical switch electrically connected across said fourth diode;
m. said fourth electrical switch connected to said control system;
n. said fifth electrical switch electrically connected across said fifth diode;
o. said fifth electrical switch connected to said control system;
p. said sixth electrical switch electrically connected across said sixth diode;
q. said sixth electrical switch connected to said control system;
r. said fourth diode electrically connected in the polarity reversed from the polarity of said fifth diode across said first input port of said first H-bridge and said second input port of said first H-bridge;
s. said second output electrically connected between said fifth diode and said sixth diode;
t. said first output of said first H-bridge electrically connected to said first input port of said high-frequency input; and
u. said second output of said first H-bridge electrically connected to said second input port of said high-frequency input.

4. The device for producing an alternating current output voltage from a high-frequency, square-wave input voltage of claim 3 comprising a plurality of said first H-bridge and whereby said control system is configured to prevent electrical shorts across the first input port and the second input port of each said first H-bridge.

5. The device for producing an alternating current output voltage from a high-frequency, square-wave input voltage of claim 3 further comprising:

a. a transformer;
b. said transformer comprising a first input port, a second input port, a first output port, and a second output port;
c. said transformer comprising a first winding electrically connecting said first input port and said second input port;
d. said transformer comprising a second winding electrically connecting said first output port and said second output port;
e. said first winding in electromagnetic communication with said second winding;
f. said first port of said high-frequency, square-wave input electrically connected to said first input port of said transformer;
g. said first output port of said transformer electrically connected to said first input port of said matrix converter;
h. said second port of said high-frequency, square-wave input electrically connected to said second input port of said transformer; and
i. said second output port of said transformer electrically connected to said second input port of said matrix converter.

6. The device for producing an alternating current output voltage from high-frequency, square-wave input of claim 5 further comprising a passive transformer voltage clamp comprising:

a. a first diode, and a first capacitor; and
b. said first diode of said passive transformer voltage clamp and said first capacitor of said passive transformer voltage clamp electrically connected in series across said first input port of said transformer and said second input port of said transformer.

7. The device for producing an alternating current output voltage from a high-frequency, square-wave input voltage of claim 5 whereby said passive transformer voltage clamp further comprises:
   a. a second diode, and a second capacitor;
   b. said second diode of said passive transformer voltage clamp and said second capacitor of said passive transformer voltage clamp electrically connected in series across said first input port of said transformer and said second input port of said transformer; and
   c. said second diode of said passive transformer voltage clamp electrically connected in the polarity reversed from the polarity of said first diode of said passive transformer voltage clamp said first input port of said transformer and said second input port of said transformer.

8. The device for producing an alternating current output voltage from high-frequency, square-wave input of claim 3 further comprising an active transformer voltage clamp comprising:
   a. a first electrical switch, a first diode, and a first capacitor;
   b. said first diode of said active transformer voltage clamp and said first capacitor of said active transformer voltage clamp electrically connected in series across said first input port of said transformer and said second input port of said transformer;
   c. said first electrical switch electrically connected across said first diode; and
   d. said control system connected to said first electrical switch of said active transformer voltage clamp.

9. The device for producing an alternating current output voltage from high-frequency, square-wave input of claim 8 whereby said active transformer voltage clamp further comprises:
   a. a second electrical switch, a second diode, and a second capacitor;
   b. said second diode of said active transformer voltage clamp and said second capacitor of said active transformer voltage clamp electrically connected in series across said first input port of said transformer and said second input port of said transformer;
   c. said second electrical switch electrically connected across said second diode;
   d. said control system connected to said second electrical switch of said active transformer voltage clamp; and
   e. said second diode electrically connected in the polarity reversed from the polarity of said first diode across said first input port of said transformer and said second input port of said transformer.

10. The device for producing an alternating current output voltage from a high-frequency, square-wave input voltage of claim 1 whereby said control system is configured to:
    a. convert the voltage across said first input of said matrix converter and said second input of said matrix converter to an alpha and beta domain;
    b. using said alpha and beta domain, determining which sector the reference vector lies within a predetermined SVPWM Hexagon; and
    c. determining the control signals for each switch of said matrix converter using said determined sector and said alpha and beta domain.

11. The device for producing an alternating current output voltage from a high-frequency, square-wave input voltage of claim 10 further comprising:
    a. a transformer,
    b. said transformer comprising a first input port, a second input port, a first output port, and a second output port;
    c. said transformer comprising a first winding electrically connecting said first input port and said second input port;
    d. said transformer comprising a second winding electrically connecting said first output port and said second output port;
    e. said first winding in electromagnetic communication with said second winding;
    f. said first port of said high-frequency, square-wave input electrically connected to said first input port of said transformer;
    g. said first output port of said transformer electrically connected to said first input port of said matrix converter;
    h. said second port of said high-frequency, square-wave input electrically connected to said second input port of said transformer; and
    i. said second output port of said transformer electrically connected to said second input port of said matrix converter.

12. The device for producing an alternating current output voltage from a high-frequency, square-wave input voltage of claim 11 further comprising a transformer voltage clamp electrically connected to said first input port of said transformer and said second input port of said transformer.

13. The device for producing an alternating current output voltage from high-frequency, square-wave input of claim 12 further comprising a first H-bridge comprising:
    a. a first input port, a second input port, a first inductor, first diode, a second diode, a first electrical switch, a second electrical switch, a third diode, a third electrical switch, a fourth diode, a fourth electrical switch, a fifth diode, a sixth diode, a fifth electrical switch, and a sixth electrical switch, a first output, and a second output;
    b. said first inductor, first diode, second diode, and third diode electrically connected in series across said first input port of said first H-bridge and second input port of said first H-bridge;
    c. said first electrical switch electrically connected across said first diode;
    d. said first electrical switch connected to said control system;
    e. said second electrical switch electrically connected across said second diode;
    f. said second electrical switch connected to said control system;
    g. said third electrical switch electrically connected across said third diode;
    h. said third electrical switch connected to said control system;
    i. said first diode electrically connected in the polarity reversed from the polarity of said second diode across said first input port of said first H-bridge and second input port of said first H-bridge;
    j. said first output electrically connected between said second diode and said third diode;
    k. said first inductor, fourth diode, fifth diode, and sixth diode electrically connected in series across said first input port of said first H-bridge and second input port of said first H-bridge;
    l. said fourth electrical switch electrically connected across said fourth diode;
    m. said fourth electrical switch connected to said control system;

n. said fifth electrical switch electrically connected across said fifth diode;
o. said fifth electrical switch connected to said control system;
p. said sixth electrical switch electrically connected across said sixth diode;
q. said sixth electrical switch connected to said control system;
r. said fourth diode electrically connected in the polarity reversed from the polarity of said fifth diode across said first input port of said first H-bridge and said second input port of said first H-bridge;
s. said second output electrically connected between said fifth diode and said sixth diode;
t. said first output of said first H-bridge electrically connected to said first input port of said high-frequency input; and
u. said second output of said first H-bridge electrically connected to said second input port of said high-frequency input.

14. The device for producing an alternating current output voltage from high-frequency, square-wave input of claim 13 further comprising an active transformer voltage clamp comprising:
   a. a first electrical switch, a first diode, and a first capacitor;
   b. said first diode of said active transformer voltage clamp and said first capacitor of said active transformer voltage clamp electrically connected in series across said first input port of said transformer and said second input port of said transformer;
   c. said first electrical switch electrically connected across said first diode; and
   d. said control system connected to said first electrical switch of said active transformer voltage clamp.

15. The device for producing an alternating current output voltage from high-frequency, square-wave input of claim 14 whereby said active transformer voltage clamp further comprises:
   a. a second electrical switch, a second diode, and a second capacitor;
   b. said second diode of said active transformer voltage clamp and said second capacitor of said active transformer voltage clamp electrically connected in series across said first input port of said transformer and said second input port of said transformer;
   c. said second electrical switch electrically connected across said second diode;
   d. said control system connected to said second electrical switch of said active transformer voltage clamp; and
   e. said second diode electrically connected in the polarity reversed from the polarity of said first diode across said first input port of said transformer and said second input port of said transformer.

16. The device for producing an alternating current output voltage from a high-frequency, square-wave input voltage of claim 15 comprising a plurality of said first H-bridge and whereby said control system is configured to prevent electrical shorts across the first input port and the second input port of each said first H-bridge.

17. A device for producing an alternating current output voltage from a high-frequency, square-wave input voltage comprising;
   a. a high-frequency, square-wave input, a matrix converter, and a control system;
   b. said high-frequency, square-wave input comprising a first port and a second port;
   c. said matrix converter comprising a first input port, a second input port, a plurality of electrical switches, and an output;
   d. said first port of said high-frequency input electrically connected to said first port of said matrix converter;
   e. said second port of said high-frequency input electrically connected to said second port of said matrix converter;
   f. said control system connected to each said electrical switch of said matrix converter; said control system comprising a voltage detector electrically connected to said first input of said matrix converter and said second input of said matrix converter;
   g. said control system configured to operate each said electrical switch of said matrix converter converting a high-frequency, square-wave input voltage across said first input port of said matrix converter and said second input port of said matrix converter to an alternating current output voltage at said output of said matrix converter; said alternating current output have a frequency less than the frequency of said high-frequency, square-wave input voltage;
   h. a matrix voltage clamp;
   i. said matrix voltage clamp comprising a first port and a second port;
   j. said matrix voltage clamp limiting the voltage across said first port of said matrix voltage clamp and said second port of said matrix voltage clamp to a predetermined maximum voltage;
   k. said first port of said matrix voltage clamp, said first port of said high-frequency input, and said first port of said matrix converter electrically connected to each other; and
   l. said second port of said matrix voltage clamp, said second port of said high-frequency input, and said second port of said matrix converter electrically connected to each other;
   m. wherein said matrix voltage clamp is an active clamp comprising;
      i. a first electrical switch, a first diode, and a first capacitor;
      ii. said first diode of said active transformer voltage clamp and said first capacitor of said active transformer voltage clamp electrically connected in series across said first input port of said matrix voltage clamp and said second input port of said matrix voltage clamp;
      iii. said first electrical switch electrically connected across said first diode; and
      iv. said control system connected to said first electrical switch of said active matrix voltage clamp.

18. The device for producing an alternating current output voltage from high-frequency, square-wave input of claim 17 whereby said active matrix voltage clamp further comprises:
   a. a second electrical switch, a second diode, and a second capacitor;
   b. said second diode of said active matrix voltage clamp and said second capacitor of said active matrix voltage clamp electrically connected in series across said first input port of said matrix voltage clamp and said second input port of said matrix voltage clamp;
   c. said second electrical switch electrically connected across said second diode;
   d. said control system connected to said second electrical switch of said/active matrix voltage clamp; and
   e. said second diode electrically connected in the polarity reversed from the polarity of said first diode across said first input port of said matrix voltage clamp and said second input port of said matrix voltage clamp.

19. The device for producing an alternating current output voltage from high-frequency, square-wave input of claim 18 further comprising a first H-bridge comprising:
   a. a first input port, a second input port, a first inductor, first diode, a second diode, a first electrical switch, a second electrical switch, a third diode, a third electrical switch, a fourth diode, a fourth electrical switch, a filth diode, a sixth diode, a fifth electrical switch, and a sixth electrical switch, a first output, and a second output;
   b. said first inductor, first diode, second diode, and third diode electrically connected in series across said first input port of said first H-bridge and second input port of said first H-bridge;
   c. said first electrical switch electrically connected across said first diode;
   d. said first electrical switch connected to said control system;
   e. said second electrical switch electrically connected across said second diode;
   f. said second electrical switch connected to said control system;
   g. said third electrical switch electrically connected across said third diode;
   h. said third electrical switch connected to said control system;
   i. said first diode electrically connected in the polarity reversed from the polarity of said second diode across said first input port of said first H-bridge and said second input port of said first H-bridge;
   j. said first output electrically connected between said second diode and said third diode;
   k. said first inductor, fourth diode, fifth diode, and sixth diode electrically connected in series across said first input port of said first H-bridge and second input port of said first H-bridge;
   l. said fourth electrical switch electrically connected across said fourth diode;
   m. said fourth electrical switch connected to said control system;
   n. said fifth electrical switch electrically connected across said fifth diode;
   o. said fifth electrical switch connected to said control system;
   p. said sixth electrical switch electrically connected across said sixth diode;
   q. said sixth electrical switch connected to said control system;
   r. said fourth diode electrically connected in the polarity reversed from the polarity of said fifth diode across said first input port of said first H-bridge and said second input port of said first H-bridge;
   s. said second output electrically connected between said fifth diode and said sixth diode;
   t. said first output of said first H-bridge electrically connected to said first input port of said high-frequency input; and
   u. said second output of said first H-bridge electrically connected to said second input port of said high-frequency input.

20. The device for producing an alternating current output voltage from a high-frequency, square-wave input voltage of claim 18 further comprising:
   a. a plurality of said first H-bridge and whereby said control system is configured to prevent electrical shorts across the first input port and the second input port of each said first H-bridge; and whereby
   b. said control system is configured to:
      i. convert the voltage across said first input of said matrix converter and said second input of said matrix converter to an alpha and beta domain;
      ii. using said alpha and beta domain, determining which sector the reference vector lies within a predetermined SVPWM Hexagon; and
      iii. determining the control signals for each switch of said matrix converter using said determined sector and said alpha and beta domain.

\* \* \* \* \*